(12) United States Patent
Piepgras et al.

(10) Patent No.: US 7,348,736 B2
(45) Date of Patent: Mar. 25, 2008

(54) METHODS AND APPARATUS FOR PROVIDING WORKSPACE LIGHTING AND FACILITATING WORKSPACE CUSTOMIZATION

(75) Inventors: Colin Piepgras, Swampscott, MA (US); Tomas Mollnow, Somerville, MA (US); Kevin J. Dowling, Westford, MA (US)

(73) Assignee: Philips Solid-State Lighting Solutions, Burlington, MA (US)

( * ) Notice: Subject to any disclaimer, the term of this patent is extended or adjusted under 35 U.S.C. 154(b) by 0 days.

(21) Appl. No.: 11/338,133

(22) Filed: Jan. 24, 2006

(65) Prior Publication Data

US 2006/0170376 A1 Aug. 3, 2006

Related U.S. Application Data

(60) Provisional application No. 60/647,054, filed on Jan. 26, 2005, provisional application No. 60/646,308, filed on Jan. 24, 2005.

(51) Int. Cl.
*G05F 1/00* (2006.01)
*H05B 37/00* (2006.01)

(52) U.S. Cl. ...................... 315/291; 315/312

(58) Field of Classification Search ............... 315/130, 315/131, 132, 291, 312, 307; 362/611–614, 362/630, 632, 633, 634, 555, 33, 523, 52, 362/84
See application file for complete search history.

(56) References Cited

U.S. PATENT DOCUMENTS

| | | | |
|---|---|---|---|
| 4,598,341 A | 7/1986 | Brackhahn et al. | |
| 4,918,690 A | 4/1990 | Markkula, Jr. et al. | |
| 4,993,561 A | 2/1991 | Stultz | |
| 5,086,385 A | 2/1992 | Launey | |
| 5,519,878 A | 5/1996 | Dolin, Jr. | |
| 5,699,243 A | 12/1997 | Eckel et al. | |
| 5,915,824 A | 6/1999 | Straat | |
| 6,016,038 A | 1/2000 | Mueller et al. | |
| 6,150,774 A | 11/2000 | Mueller et al. | |
| 6,166,496 A | 12/2000 | Lys et al. | |
| 6,180,884 B1 * | 1/2001 | Tokunaga et al. | ........... 174/659 |
| 6,211,626 B1 | 4/2001 | Lys et al. | |
| 6,292,901 B1 | 9/2001 | Lys et al. | |
| 6,340,868 B1 | 1/2002 | Lys et al. | |
| 6,374,079 B1 | 4/2002 | Hsu | |

(Continued)

OTHER PUBLICATIONS http://www.strandlight.com/US/architectural.html, *Architectural Control Systems*, Jan. 26, 2006, p. 1

(Continued)

*Primary Examiner*—Shih-Chao Chen
*Assistant Examiner*—Minh Dieu A
(74) *Attorney, Agent, or Firm*—Wolf, Greenfield & Sacks, P.C.

(57) ABSTRACT

Methods and apparatus for customization of a workspace, including lighting in the workspace. Multiple LED-based lighting units arranged in a personal workspace may be conveniently controlled by an occupant of the workspace to customize or personalize workspace lighting. Workspace customization, including lighting conditions, further is facilitated by various power distribution schemes to allow convenient access to power in the workspace for lighting units and other electronic devices. Workspace dividers, partitions and walls may be particularly configured to accommodate power distribution systems and various components of networked lighting systems in the workspace environment.

59 Claims, 13 Drawing Sheets

U.S. PATENT DOCUMENTS

| | | |
|---|---|---|
| 6,386,720 B1 | 5/2002 | Mochizuki |
| 6,459,919 B1 | 10/2002 | Lys et al. |
| 6,466,234 B1 | 10/2002 | Pyle et al. |
| 6,528,954 B1 | 3/2003 | Lys et al. |
| 6,548,967 B1 | 4/2003 | Dowling et al. |
| 6,577,080 B2 | 6/2003 | Lys et al. |
| 6,583,573 B2 * | 6/2003 | Bierman ................... 315/149 |
| 6,608,453 B2 | 8/2003 | Morgan et al. |
| 6,624,597 B2 | 9/2003 | Dowling et al. |
| 6,717,376 B2 | 4/2004 | Lys et al. |
| 6,720,745 B2 | 4/2004 | Mueller et al. |
| 6,774,584 B2 | 8/2004 | Lys et al. |
| 6,777,891 B2 | 8/2004 | Lys et al. |
| 6,781,329 B2 | 8/2004 | Morgan et al. |
| 6,788,011 B2 | 9/2004 | Mueller et al. |
| 6,801,003 B2 | 10/2004 | Schanberger et al. |
| 6,806,659 B1 | 10/2004 | Mueller et al. |
| 6,814,462 B1 | 11/2004 | Fiene |
| 6,868,292 B2 | 3/2005 | Ficco et al. |
| 6,869,204 B2 | 3/2005 | Piepgras et al. |
| 6,883,929 B2 | 4/2005 | Dowling |
| 6,888,322 B2 | 5/2005 | Dowling et al. |
| 6,897,624 B2 | 5/2005 | Ducharme et al. |
| 6,936,978 B2 | 8/2005 | Morgan et al. |
| 6,965,205 B2 | 11/2005 | Piepgras et al. |
| 6,967,448 B2 | 11/2005 | Morgan et al. |
| 6,969,954 B2 | 11/2005 | Lys |
| 6,975,079 B2 | 12/2005 | Lys et al. |
| 7,031,920 B2 | 4/2006 | Dowling et al. |
| 7,038,398 B1 | 5/2006 | Lys et al. |
| 7,038,399 B2 | 5/2006 | Lys et al. |
| 7,042,172 B2 | 5/2006 | Dowling et al. |
| 7,202,613 B2 * | 4/2007 | Morgan et al. ............. 315/312 |
| 2002/0038157 A1 | 3/2002 | Dowling et al. |
| 2002/0048169 A1 | 4/2002 | Dowling et al. |
| 2002/0070688 A1 | 6/2002 | Dowling et al. |
| 2002/0074559 A1 | 6/2002 | Dowling et al. |
| 2002/0078221 A1 | 6/2002 | Blackwell et al. |
| 2002/0130627 A1 | 9/2002 | Dowling et al. |
| 2002/0145394 A1 | 10/2002 | Morgan et al. |
| 2002/0145869 A1 | 10/2002 | Dowling |
| 2002/0152045 A1 | 10/2002 | Dowling et al. |
| 2002/0158583 A1 | 10/2002 | Lys et al. |
| 2002/0176259 A1 | 11/2002 | Ducharme |
| 2003/0011538 A1 | 1/2003 | Lys et al. |
| 2003/0028260 A1 | 2/2003 | Blackwell |
| 2003/0057884 A1 | 3/2003 | Dowling et al. |
| 2003/0057887 A1 | 3/2003 | Dowling et al. |
| 2003/0076281 A1 | 4/2003 | Morgan et al. |
| 2003/0100837 A1 | 5/2003 | Lys et al. |
| 2003/0133292 A1 | 7/2003 | Mueller et al. |
| 2003/0222587 A1 | 12/2003 | Dowling et al. |
| 2004/0036006 A1 | 2/2004 | Dowling |
| 2004/0052076 A1 | 3/2004 | Mueller et al. |
| 2004/0090191 A1 | 5/2004 | Mueller et al. |
| 2004/0090787 A1 | 5/2004 | Dowling et al. |
| 2004/0105261 A1 | 6/2004 | Ducharme et al. |
| 2004/0116039 A1 | 6/2004 | Mueller et al. |
| 2004/0130909 A1 | 7/2004 | Mueller et al. |
| 2004/0178751 A1 | 9/2004 | Mueller et al. |
| 2004/0212320 A1 | 10/2004 | Dowling et al. |
| 2004/0212993 A1 | 10/2004 | Morgan et al. |
| 2005/0016081 A1 * | 1/2005 | Gomree et al. ............. 52/36.1 |
| 2005/0099284 A1 | 5/2005 | Dowling et al. |
| 2005/0116667 A1 | 6/2005 | Mueller et al. |
| 2005/0151489 A1 | 7/2005 | Lys et al. |
| 2005/0213352 A1 | 9/2005 | Lys et al. |
| 2005/0213353 A1 | 9/2005 | Lys |
| 2005/0218838 A1 | 10/2005 | Lys |
| 2005/0218870 A1 | 10/2005 | Lys |
| 2005/0219872 A1 | 10/2005 | Lys |
| 2005/0231133 A1 | 10/2005 | Lys |
| 2005/0236029 A1 | 10/2005 | Dowling |
| 2005/0236998 A1 | 10/2005 | Mueller |
| 2005/0253533 A1 | 11/2005 | Lys et al. |
| 2005/0275626 A1 | 12/2005 | Mueller |
| 2005/0276053 A1 | 12/2005 | Nortrup |
| 2005/0281030 A1 * | 12/2005 | Leong et al. ............... 362/234 |
| 2006/0002110 A1 | 1/2006 | Dowling |
| 2006/0012987 A9 | 1/2006 | Ducharme |
| 2006/0016960 A1 | 1/2006 | Morgan |
| 2006/0022214 A1 | 2/2006 | Morgan |
| 2006/0050509 A9 | 3/2006 | Dowling |
| 2006/0053447 A1 | 3/2006 | Krzyzanowski et al. |
| 2006/0076908 A1 | 4/2006 | Morgan |
| 2006/0098077 A1 | 5/2006 | Dowling |
| 2006/0104058 A1 | 5/2006 | Chemel et al. |

OTHER PUBLICATIONS

Strand Lighting Specification, Premiere Control System, pp. 1-7, no date.

* cited by examiner

METHODS AND APPARATUS FOR PROVIDING WORKSPACE LIGHTING AND FACILITATING WORKSPACE CUSTOMIZATION

CROSS-REFERENCES TO RELATED APPLICATIONS

This application claims the benefit, under 35 U.S.C. 119(e), of U.S. Provisional Application Ser. No. 60/646,308, filed Jan. 24, 2005, entitled "Office Lighting" and U.S. Provisional Application Ser. No. 60/647,054, filed Jan. 26, 2005, also entitled "Office Lighting," both of which applications are hereby incorporated by reference.

BACKGROUND

Personal workspaces typically represent partitioned areas in which an individual may perform various tasks with minimal distractions. A well-known example of a personal workspace in a common office environment is a cubicle. The conventional cubicle comprises an at least partially enclosed area that is separated from neighboring workspaces by some sort of wall structure or partition. Generally, at least some horizontal work surfaces may be suspended from such wall structures or partitions, as well as shelving, overhead storages and other office elements. Examples of personal workspaces in the academic environment may include library carrels, laboratories and dormitories. Individuals often retreat to these spaces in order to focus on their studies. In the business travel environment, a personal workspace may include a hotel room, an airplane seat and a train compartment. Basically, any designated area that protects the working individual against external distractions and/or generally fosters working conditions may constitute a personal workspace.

In some circumstances, an occupant of a workspace such as a cubicle may prefer to customize and install various office elements in her workspace according to her needs or preferences. Accordingly, cubicles may be designed to afford at least some degree of configurability to the occupant. Often the occupant may be somewhat limited, however, in her options for configuration due to the fixed locations of desk space, shelving, and the like, as well as the fixed locations of various electrical elements, such as electrical power outlets, phone connections, and computer/ network connections. For example, an occupant generally could not configure her cubicle in a manner that prevents her computer from accessing an electrical outlet and/or network connection. Other electrical appliances within the cubicle, such as desk lamps, electric staplers or pencil sharpeners, clocks, radios/music playing devices, cell phone rechargers, power strips, and various devices requiring conventional transformers, give rise to similar constraints. Furthermore, in the event that the occupant ever needs to relocate to a new workspace, she may face a significant challenge in reconfiguring the new workspace according to her customized preferences.

In addition to issues of configurability within a personal workspace, lighting is also an important factor that affects personal comfort, health, and work effectiveness. Vision problems are one of the leading sources of complaints among office workers. Poor office lighting can cause eye strain and a decrease in visual acuity. Headaches as well as neck and back pains may occur as a result of improper or inadequate lighting that can lead, for example, to workers straining to see small or detailed items. Poor lighting in the workplace is also associated with an increase in accidents. For example, direct and reflected glare and shadows, as well as delayed eye adaptation when moving from brightly lit surroundings into darker ones (or vice versa), may prevent an employee from seeing a hazard or tripping over an object.

While some of the issues discussed above are presented in the context of a cubicle as an exemplary personal workspace, it should be readily appreciated that one or more of these issues may be relevant to other types of personal workspaces as well.

SUMMARY

In view of the issues discussed above in connection with personal workspaces, Applicants have recognized and appreciated that the ability of an occupant to significantly personalize a workspace (e.g., arrange or configure various aspects of the workspace in a customized manner) is desirable for a number of reasons including, but not limited to, increased personal comfort and a corresponding increase in work effectiveness. Facilitating workspace customization or personalization may involve a number of concepts, including flexible placement of objects in the workspace environment, convenient distribution of electrical and communication resources (e.g., electrical power distribution, placement of outlets and power sources, computer and telephone related connections), mobility and re-configurability of the workspace, integration of the workspace with a larger environment (e.g., the integration of a cubicle in an overall office floor plan or layout), and lighting in and around the personal workspace.

In particular, Applicants have recognized and appreciated that the ability to customize or personalize (e.g., arrange and control) lighting in a workspace may have notably positive effects on an occupant's well-being, and hence work effectiveness. For example, it is well known that the quantity and quality of light in a given environment may have a dramatic effect, not only on a person's visual acuity, but also on her overall perception, emotional state and mood.

One common example of human perception of light in a conventional office environment, and how mood or tone is created by such light, is given by the relatively "colder feel" of fluorescent lighting as compared to the "warmer feel" of incandescent lighting. Fluorescent lighting is employed ubiquitously in workspace environments, in large part due to its energy efficiency (and hence lower operating cost) as compared to incandescent lighting. However, many individuals have a personal preference for warmer, incandescent lighting, which in some sense has properties generally similar to natural daylight on a relatively sunny and clear day. Beyond ambient white light, human perception and mood also may be dramatically affected by different colors of light.

In view of the foregoing, the present disclosure generally is directed to concepts that facilitate customization of a personal workspace, including lighting in the workspace. In various embodiments, a number of concepts that facilitate a flexible configuration of various elements in a workspace environment are disclosed, including various power distribution schemes to allow convenient access to power in the workspace. In other embodiments, a number of lighting technologies may be applied to generally improve the personal workspace, such as by enhancing office ergonomics, providing an aesthetically pleasing environment, improving health, safety, general well-being, and providing information via lighting, all in a manner that is easily configurable and controllable according to the preferences of an occupant of the workspace. The systems described herein include various combinations of lighting control technologies, power and data distribution systems, and different types of lighting units, to achieve improved workspace lighting. Also disclosed herein in various embodiments are partitions, walls, and other workspace surfaces configured to accommodate various components of networked lighting systems and a variety of lighting configurations, as well as methods and systems for controllable and/or programmable lighting devices in a personal workspace environment.

For example, one embodiment is directed to a workspace, comprising at least one work surface and at least one divider to provide at least one boundary for the workspace, wherein the at least one divider includes a frame and at least one finished surface exposed to the workspace. The workspace further comprises a plurality of LED-based lighting units to generate visible light in the workspace, and at least one controller to control at least some of the plurality of LED-based lighting units, wherein the at least one controller is disposed in an interior portion of the frame of the at least one divider. The workspace further comprises at least one power supply disposed in the interior portion of the frame of the at least one divider, wherein the at least one power supply receives as an input an AC line voltage and provides as an output a DC voltage, and wherein the DC voltage provides operating power for at least some of the plurality of LED-based lighting units. The workspace further comprises at least one user-interface, coupled to the at least one controller, to facilitate control of at least one characteristic of at least some of the visible light generated in the workspace by at least some of the plurality of LED-based lighting units.

Another embodiment is directed to a method of providing lighting in a workspace including at least one work surface, the method comprising acts of: A) generating visible light in the workspace via at least one LED-based lighting unit; and B) controlling at least one of a color and a color temperature of at least some of the visible light generated in the workspace via at least one user-interface.

Another embodiment is directed to a workspace, comprising at least one work surface, at least one LED-based lighting unit to generate visible light in the workspace, and at least one user-interface, coupled to the at least one LED-based lighting unit, to facilitate control of at least one of a color and a color temperature of at least some of the visible light generated in the workspace.

As used herein for purposes of the present disclosure, the term "LED" should be understood to include any electroluminescent diode or other type of carrier injection/junction-based system that is capable of generating radiation in response to an electric signal. Thus, the term LED includes, but is not limited to, various semiconductor-based structures that emit light in response to current, light emitting polymers, organic lighting emitting diodes (OLEDs), electroluminescent strips, and the like.

In particular, the term LED refers to light emitting diodes of all types (including semi-conductor and organic light emitting diodes) that may be configured to generate radiation in one or more of the infrared spectrum, ultraviolet spectrum, and various portions of the visible spectrum (generally including radiation wavelengths from approximately 500 nanometers to approximately 700 nanometers). Some examples of LEDs include, but are not limited to, various types of infrared LEDs, ultraviolet LEDs, red LEDs, blue LEDs, green LEDs, yellow LEDs, amber LEDs, orange LEDs, and white LEDs (discussed further below). It also should be appreciated that LEDs may be configured and/or controlled to generate radiation having various bandwidths (e.g., full widths at half maximum, or FWHM) for a given spectrum (e.g., narrow bandwidth, broad bandwidth), and a variety of dominant wavelengths within a given general color categorization.

For example, one implementation of an LED configured to generate essentially white light (e.g., a white LED) may include a number of dies which respectively emit different spectra of electroluminescence that, in combination, mix to form essentially white light. In another implementation, a white light LED may be associated with a phosphor material that converts electroluminescence having a first spectrum to a different second spectrum. In one example of this implementation, electroluminescence having a relatively short wavelength and narrow bandwidth spectrum "pumps" the phosphor material, which in turn radiates longer wavelength radiation having a somewhat broader spectrum.

It should also be understood that the term LED does not limit the physical and/or electrical package type of an LED. For example, as discussed above, an LED may refer to a single light emitting device having multiple dies that are configured to respectively emit different spectra of radiation (e.g., that may or may not be individually controllable). Also, an LED may be associated with a phosphor that is considered as an integral part of the LED (e.g., some types of white LEDs). In general, the term LED may refer to packaged LEDs, non-packaged LEDs, surface mount LEDs, chip-on-board LEDs, T-package mount LEDs, radial package LEDs, power package LEDs, LEDs including some type of encasement and/or optical element (e.g., a diffusing lens), etc.

The term "light source" should be understood to refer to any one or more of a variety of radiation sources, including, but not limited to, LED-based sources (including one or more LEDs as defined above), incandescent sources (e.g., filament lamps, halogen lamps), fluorescent sources, phosphorescent sources, high-intensity discharge sources (e.g., sodium vapor, mercury vapor, and metal halide lamps), lasers, other types of electroluminescent sources, pyro-luminescent sources (e.g., flames), candle-luminescent sources (e.g., gas mantles, carbon arc radiation sources), photo-luminescent sources (e.g., gaseous discharge sources), cathode luminescent sources using electronic satiation, galvano-luminescent sources, crystallo-luminescent sources, kine-luminescent sources, thermo-luminescent sources, triboluminescent sources, sonoluminescent sources, radioluminescent sources, and luminescent polymers. A given light source may be configured to generate electromagnetic radiation within the visible spectrum, outside the visible spectrum, or a combination of both. Hence, the terms "light" and "radiation" are used interchangeably herein. Additionally, a light source may include as an integral component one or more filters (e.g., color filters), lenses, or other optical components. Also, it should be understood that light sources may be configured for a variety of applications, including, but not limited to, indication, display, and/or illumination. An "illumination source" is a light source that is particularly configured to generate radiation having a sufficient intensity to effectively illuminate an interior or exterior space. In this context, "sufficient intensity" refers to sufficient radiant power in the visible spectrum generated in the space or environment (the unit "lumens" often is employed to represent the total light output from a light source in all directions, in terms of radiant power or "luminous flux") to provide ambient illumination (i.e., light that may be perceived indirectly and that may be, for example, reflected off of one or more of a variety of intervening surfaces before being perceived in whole or in part).

The term "spectrum" should be understood to refer to any one or more frequencies (or wavelengths) of radiation produced by one or more light sources. Accordingly, the term "spectrum" refers to frequencies (or wavelengths) not only in the visible range, but also frequencies (or wavelengths) in the infrared, ultraviolet, and other areas of the overall electromagnetic spectrum. Also, a given spectrum may have a relatively narrow bandwidth (e.g., a FWHM having essentially few frequency or wavelength components) or a relatively wide bandwidth (several frequency or wavelength components having various relative strengths). It should also be appreciated that a given spectrum may be the result of a mixing of two or more other spectra (e.g., mixing radiation respectively emitted from multiple light sources).

For purposes of this disclosure, the term "color" is used interchangeably with the term "spectrum." However, the term "color" generally is used to refer primarily to a property of radiation that is perceivable by an observer (although this usage is not intended to limit the scope of this term). Accordingly, the terms "different colors" implicitly refer to multiple spectra having different wavelength components and/or bandwidths. It also should be appreciated that the term "color" may be used in connection with both white and non-white light.

The term "color temperature" generally is used herein in connection with white light, although this usage is not intended to limit the scope of this term. Color temperature essentially refers to a particular color content or shade (e.g., reddish, bluish) of white light. The color temperature of a given radiation sample conventionally is characterized according to the temperature in degrees Kelvin (K) of a black body radiator that radiates essentially the same spectrum as the radiation sample in question. Black body radiator color temperatures generally fall within a range of from approximately 700 degrees K (typically considered the first visible to the human eye) to over 10,000 degrees K; white light generally is perceived at color temperatures above 1500-2000 degrees K.

Lower color temperatures generally indicate white light having a more significant red component or a "warmer feel," while higher color temperatures generally indicate white light having a more significant blue component or a "cooler feel." By way of example, fire has a color temperature of approximately 1,800 degrees K, a conventional incandescent bulb has a color temperature of approximately 2848 degrees K, early morning daylight has a color temperature of approximately 3,000 degrees K, and overcast midday skies have a color temperature of approximately 10,000 degrees K. A color image viewed under white light having a color temperature of approximately 3,000 degree K has a relatively reddish tone, whereas the same color image viewed under white light having a color temperature of approximately 10,000 degrees K has a relatively bluish tone.

The terms "lighting unit" and "lighting fixture" are used interchangeably herein to refer to an apparatus including one or more light sources of same or different types. A given lighting unit may have any one of a variety of mounting arrangements for the light source(s), enclosure/housing arrangements and shapes, and/or electrical and mechanical connection configurations. Additionally, a given lighting unit optionally may be associated with (e.g., include, be coupled to and/or packaged together with) various other components (e.g., control circuitry) relating to the operation of the light source(s). An "LED-based lighting unit" refers to a lighting unit that includes one or more LED-based light sources as discussed above, alone or in combination with other non LED-based light sources. A "multi-channel" lighting unit refers to an LED-based or non LED-based lighting unit that includes at least two light sources configured to respectively generate different spectrums of radiation, wherein each different source spectrum may be referred to as a "channel" of the multi-channel lighting unit.

The term "controller" is used herein generally to describe various apparatus relating to the operation of one or more light sources. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

In various implementations, a processor or controller may be associated with one or more storage media (generically referred to herein as "memory," e.g., volatile and non-volatile computer memory such as RAM, PROM, EPROM, and EEPROM, floppy disks, compact disks, optical disks, magnetic tape, etc.). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present disclosure discussed herein. The terms "program" or "computer program" are used herein in a generic sense to refer to any type of computer code (e.g., software or microcode) that can be employed to program one or more processors or controllers.

The term "addressable" is used herein to refer to a device (e.g., a light source in general, a lighting unit or fixture, a controller or processor associated with one or more light sources or lighting units, other non-lighting related devices, etc.) that is configured to receive information (e.g., data) intended for multiple devices, including itself, and to selectively respond to particular information intended for it. The term "addressable" often is used in connection with a networked environment (or a "network," discussed further below), in which multiple devices are coupled together via some communications medium or media.

In one network implementation, one or more devices coupled to a network may serve as a controller for one or more other devices coupled to the network (e.g., in a master/slave relationship). In another implementation, a networked environment may include one or more dedicated controllers that are configured to control one or more of the devices coupled to the network. Generally, multiple devices coupled to the network each may have access to data that is present on the communications medium or media; however, a given device may be "addressable" in that it is configured to selectively exchange data with (i.e., receive data from and/or transmit data to) the network, based, for example, on one or more particular identifiers (e.g., "addresses") assigned to it.

The term "network" as used herein refers to any interconnection of two or more devices (including controllers or processors) that facilitates the transport of information (e.g. for device control, data storage, data exchange, etc.) between any two or more devices and/or among multiple devices coupled to the network. As should be readily appreciated, various implementations of networks suitable for interconnecting multiple devices may include any of a variety of network topologies and employ any of a variety of communication protocols. Additionally, in various networks according to the present disclosure, any one connection between two devices may represent a dedicated connection between the two systems, or alternatively a non-dedicated connection. In addition to carrying information intended for the two devices, such a non-dedicated connection may carry information not necessarily intended for either of the two devices (e.g., an open network connection). Furthermore, it should be readily appreciated that various networks of devices as discussed herein may employ one or more wireless, wire/cable, and/or fiber optic links to facilitate information transport throughout the network.

The term "user interface" as used herein refers to an interface between a human user or operator and one or more devices that enables communication between the occupant and the device(s). Examples of user interfaces that may be employed in various implementations of the present disclosure include, but are not limited to, switches, potentiometers, buttons, dials, sliders, a mouse, keyboard, keypad, various types of game controllers (e.g., joysticks), track balls, display screens, various types of graphical user interfaces (GUIs), touch screens, microphones and other types of sensors that may receive some form of human-generated stimulus and generate a signal in response thereto.

The following patents and patent applications are hereby incorporated herein by reference:

U.S. Pat. No. 6,016,038, issued Jan. 18, 2000, entitled "Multicolored LED Lighting Method and Apparatus;"

U.S. Pat. No. 6,211,626, issued Apr. 3, 2001 to Lys et al, entitled "Illumination Components,"

U.S. Pat. No. 6,608,453, issued Aug. 19, 2003, entitled "Methods and Apparatus for Controlling Devices in a Networked Lighting System;"

U.S. Pat. No. 6,548,967, issued Apr. 15, 2003, entitled "Universal Lighting Network Methods and Systems;"

U.S. Pat. No. 6,717,376, issued Apr. 6, 2004, entitled "Methods and Apparatus for Controlling Devices in a Networked Lighting System;" U.S. Pat. No. 6,965,205, issued Nov. 15, 2005, entitled "Light Emitting Diode Based Products;"

U.S. Pat. No. 6,967,448, issued Nov. 22, 2005, entitled "Methods and Apparatus for Controlling Illumination;"

U.S. Pat. No. 6,975,079, issued Dec. 13, 2005, entitled "Systems and Methods for Controlling Illumination Sources;"

U.S. patent application Ser. No. 09/886,958, filed Jun. 21, 2001, entitled Method and Apparatus for Controlling a Lighting System in Response to an Audio Input;"

U.S. patent application Ser. No. 10/078,221, filed Feb. 19, 2002, entitled "Systems and Methods for Programming Illumination Devices;"

U.S. patent application Ser. No. 09/344,699, filed Jun. 25, 1999, entitled "Method for Software Driven Generation of Multiple Simultaneous High Speed Pulse Width Modulated Signals;"

U.S. patent application Ser. No. 09/805,368, filed Mar. 13, 2001, entitled "Light-Emitting Diode Based Products;"

U.S. patent application Ser. No. 09/716,819, filed Nov. 20, 2000, entitled "Systems and Methods for Generating and Modulating Illumination Conditions;"

U.S. patent application Ser. No. 09/675,419, filed Sep. 29, 2000, entitled "Systems and Methods for Calibrating Light Output by Light-Emitting Diodes;"

U.S. patent application Ser. No. 09/870,418, filed May 30, 2001, entitled "A Method and Apparatus for Authoring and Playing Back Lighting Sequences;"

U.S. patent application Ser. No. 10/045,604, filed Mar. 27, 2003, entitled "Systems and Methods for Digital Entertainment;"

U.S. patent application Ser. No. 09/989,677, filed Nov. 20, 2001, entitled "Information Systems;"

U.S. patent application Ser. No. 10/163,085, filed Jun. 5, 2002, entitled "Systems and Methods for Controlling Programmable Lighting Systems;"

U.S. patent application Ser. No. 10/245,788, filed Sep. 17, 2002, entitled "Methods and Apparatus for Generating and Modulating White Light Illumination Conditions;"

U.S. patent application Ser. No. 10/325,635, filed Dec. 19, 2002, entitled "Controlled Lighting Methods and Apparatus;"

U.S. patent application Ser. No. 10/360,594, filed Feb. 6, 2003, entitled "Controlled Lighting Methods and Apparatus;"

U.S. patent application Ser. No. 10/435,687, filed May 9, 2003, entitled "Methods and Apparatus for Providing Power to Lighting Devices;"

U.S. patent application Ser. No. 10/828,933, filed Apr. 21, 2004, entitled "Tile Lighting Methods and Systems;"

U.S. patent application Ser. No. 10/839,765, filed May 5, 2004, entitled "Lighting Methods and Systems;"

U.S. patent application Ser. No. 11/010,840, filed Dec. 13, 2004, entitled "Thermal Management Methods and Apparatus for Lighting Devices;"

U.S. patent application Ser. No. 11/079,904, filed Mar. 14, 2005, entitled "LED Power Control Methods and Apparatus;"

U.S. patent application Ser. No. 11/081,020, filed on Mar. 15, 2005, entitled "Methods and Systems for Providing Lighting Systems;"

U.S. patent application Ser. No. 11/178,214, filed Jul. 8, 2005, entitled "LED Package Methods and Systems;"

U.S. patent application Ser. No. 11/225,377, filed Sep. 12, 2005, entitled "Power Control Methods and Apparatus for Variable Loads;" and U.S. patent application Ser. No. 11/224,683, filed Sep. 12, 2005, entitled "Lighting Zone Control Methods and Systems."

It should be appreciated that all combinations of the foregoing concepts and additional concepts discussed in greater detail below are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

DETAILED DESCRIPTION

Various embodiments of the present disclosure relating to methods and apparatus for facilitating workspace customization and providing workspace lighting are described below, including certain embodiments relating particularly to LED-based light sources. It should be appreciated, however, that the present disclosure is not limited to any particular manner of implementation, and that the various embodiments discussed explicitly herein are primarily for purposes of illustration. For example, the various concepts discussed herein may be suitably implemented in a variety of environments involving LED-based light sources, other types of light sources not including LEDs, environments that involve both LEDs and other types of light sources in combination, and environments that involve non-lighting-related devices alone or in combination with various types of light sources.

Pursuant to the various embodiments disclosed herein, the ability to personalize a workspace (e.g. arrange or configure various aspects of the workspace in a customized manner) is recognized as having notably positive effects on a workspace occupant's well-being and work effectiveness. Facilitating workspace personalization may involve any number of concepts, including flexible placement of objects in the workspace environment, convenient distribution of electrical and communication resources (e.g., electrical power distribution, placement of outlets and power sources, computer and telephone related connections), mobility and re-configurability of the workspace, integration of the workspace with a larger environment (e.g., the integration of a cubicle in an overall office plan or layout), and lighting in and around the personal workspace. Given the particular importance of lighting in the workspace, and the notable benefits of controllable lighting to create a customized or personalized environment, exemplary LED-based lighting units that may be employed in various embodiments of the present disclosure are discussed initially below.

Figure 1:
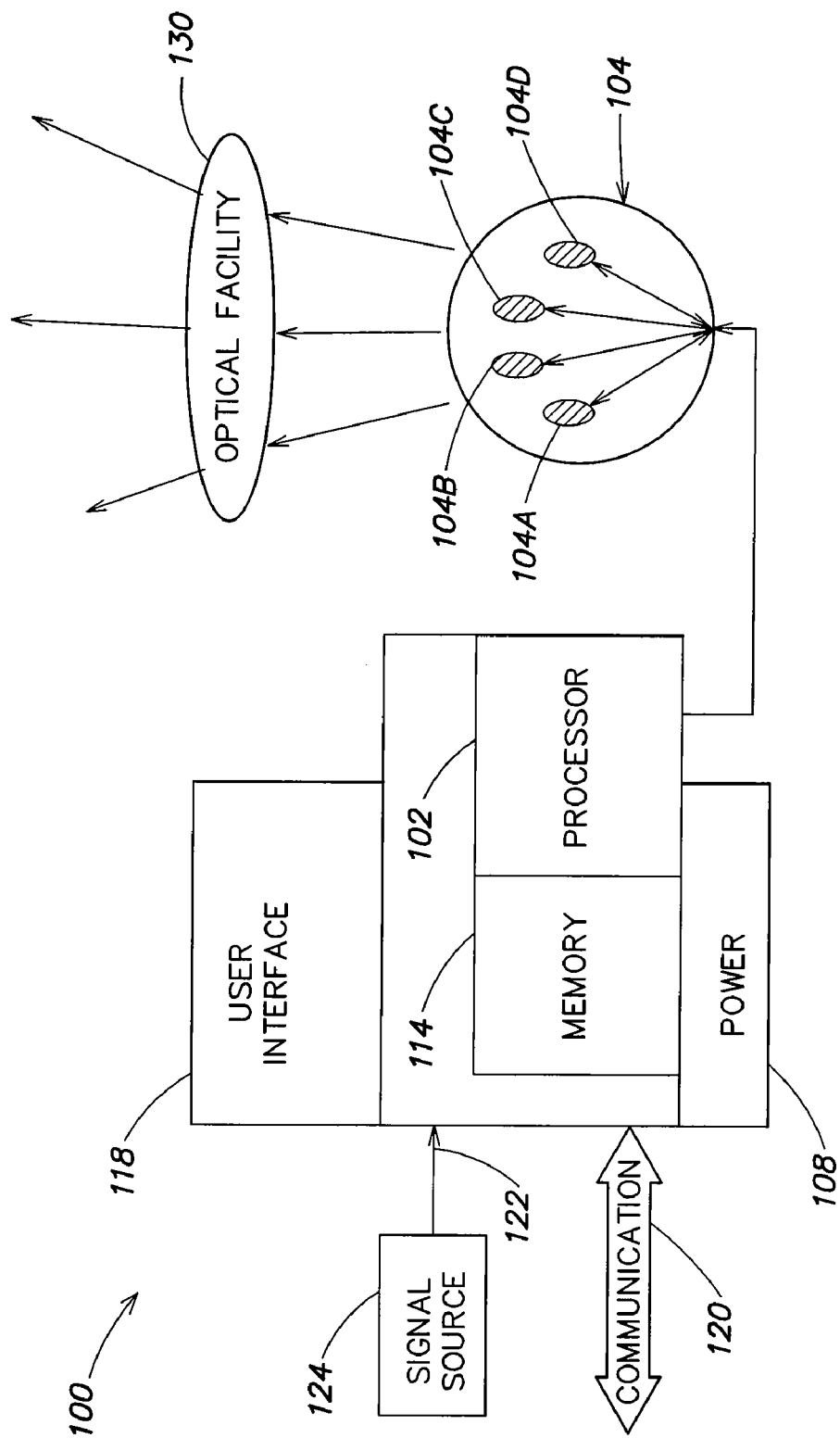
FIG. 1 is a diagram illustrating a lighting unit according to one embodiment of the disclosure.

FIG. 1 illustrates an example of a lighting unit 100 that may be employed in a variety of manners in an overall workspace lighting arrangement according to various embodiments of the present disclosure. Some general examples of LED-based lighting units similar to those that are described below in connection with FIG. 1 may be found, for example, in U.S. Pat. No. 6,016,038, issued Jan. 18, 2000 to Mueller et al., entitled "Multicolored LED Lighting Method and Apparatus," and U.S. Pat. No. 6,211,626, issued Apr. 3, 2001 to Lys et al, entitled "Illumination Components," both of which are hereby incorporated herein by reference.

In various embodiments of the present disclosure, the lighting unit 100 shown in FIG. 1 may be used alone or together with other similar lighting units in a system of lighting units (e.g., as discussed further below in connection with FIG. 2). Used alone or in combination with other lighting units, the lighting unit 100 may be employed in a variety of applications including, but not limited to, interior or exterior workspace illumination in general, direct or indirect illumination of objects or spaces, decorative lighting, safety-oriented lighting, wayfinding lighting, privacy lighting, zone controlled lighting, combined illumination and communication systems, etc., as well as for various indication, display and informational purposes.

Additionally, one or more lighting units similar to that described in connection with FIG. 1 may be implemented in a variety of products including, but not limited to, various forms of light modules or bulbs having various shapes and electrical/mechanical coupling arrangements (including replacement or "retrofit" modules or bulbs adapted for use in conventional sockets or fixtures), as well as a variety of consumer and/or workplace-related (e.g., night lights, audio/visual related components or systems, appliances, etc.) and architectural components (e.g., lighted panels for walls, floors, ceilings, workspace partitions or dividers, lighted trim and ornamentation components, etc.).

In one embodiment, the lighting unit 100 shown in FIG. 1 may include one or more light sources 104A, 104B, 104C, and 104D (shown collectively as 104), wherein one or more of the light sources may be an LED-based light source that includes one or more light emitting diodes (LEDs). In one aspect of this embodiment, any two or more of the light sources may be adapted to generate radiation of different colors (e.g. red, green, blue); in this respect, as discussed above, each of the different color light sources generates a different source spectrum that constitutes a different "channel" of a "multi-channel" lighting unit. Although FIG. 1 shows four light sources 104A, 104B, 104C, and 104D, it should be appreciated that the lighting unit is not limited in this respect, as different numbers and various types of light sources (all LED-based light sources, LED-based and non-LED-based light sources in combination, etc.) adapted to generate radiation of a variety of different colors, including essentially white light, may be employed in the lighting unit 100, as discussed further below.

As shown in FIG. 1, the lighting unit 100 also may include a processor 102 that is configured to output one or more control signals to drive the light sources so as to generate various intensities of light from the light sources. For example, in one implementation, the processor 102 may be configured to output at least one control signal for each light source so as to independently control the intensity of light (e.g., radiant power in lumens) generated by each light source. Some examples of control signals that may be generated by the processor to control the light sources include, but are not limited to, pulse modulated signals, pulse width modulated signals (PWM), pulse amplitude modulated signals (PAM), pulse code modulated signals (PCM) analog control signals (e.g., current control signals, voltage control signals), combinations and/or modulations of the foregoing signals, or other control signals. In one aspect, particularly in connection with LED-based sources, one or more modulation techniques provide for variable control using a fixed current level applied to one or more LEDs, so as to mitigate potential undesirable or unpredictable variations in LED output that may arise if a variable LED drive current were employed. In another aspect, the processor 102 may control other dedicated circuitry (not shown in FIG. 1) which in turn controls the light sources so as to vary their respective intensities.

In general, the intensity (radiant output power) of radiation generated by the one or more light sources is proportional to the average power delivered to the light source(s) over a given time period. Accordingly, one technique for varying the intensity of radiation generated by the one or more light sources involves modulating the power delivered to (i.e., the operating power of) the light source(s). For some types of light sources, including LED-based sources, this may be accomplished effectively using a pulse width modulation (PWM) technique.

In one exemplary implementation of a PWM control technique, for each channel of a lighting unit a fixed predetermined voltage $V_{source}$ is applied periodically across a given light source constituting the channel. The application of the voltage $V_{source}$ may be accomplished via one or more switches, not shown in FIG. 1, controlled by the processor 102. While the voltage $V_{source}$ is applied across the light source, a predetermined fixed current $I_{source}$ (e.g., determined by a current regulator, also not shown in FIG. 1) is allowed to flow through the light source. Again, recall that an LED-based light source may include one or more LEDs, such that the voltage $V_{source}$ may be applied to a group of LEDs constituting the source, and the current $I_{source}$ may be drawn by the group of LEDs. The fixed voltage $V_{source}$ across the light source when energized, and the regulated current $I_{source}$ drawn by the light source when energized, determines the amount of instantaneous operating power $P_{source}$ of the light source ($P_{source} = V_{source} * I_{source}$). As mentioned above, for LED-based light sources, using a regulated current mitigates potential undesirable or unpredictable variations in LED output that may arise if a variable LED drive current were employed.

According to the PWM technique, by periodically applying the voltage $V_{source}$ to the light source and varying the time the voltage is applied during a given on-off cycle, the average power delivered to the light source over time (the average operating power) may be modulated. In particular, the processor 102 may be configured to apply the voltage $V_{source}$ to a given light source in a pulsed fashion (e.g., by outputting a control signal that operates one or more switches to apply the voltage to the light source), preferably at a frequency that is greater than that capable of being detected by the human eye (e.g., greater than approximately 100 Hz). In this manner, an observer of the light generated by the light source does not perceive the discrete on-off cycles (commonly referred to as a "flicker effect"), but instead the integrating function of the eye perceives essentially continuous light generation. By adjusting the pulse width (i.e. on-time, or "duty cycle") of on-off cycles of the control signal, the processor varies the average amount of time the light source is energized in any given time period, and hence varies the average operating power of the light source. In this manner, the perceived brightness of the generated light from each channel in turn may be varied.

As discussed in greater detail below, the processor 102 may be configured to control each different light source channel of a multi-channel lighting unit at a predetermined average operating power to provide a corresponding radiant output power for the light generated by each channel. Alternatively, the processor 102 may receive instructions (e.g., "lighting commands") from a variety of origins, such as a user interface 118, a signal source 124, or one or more communication ports 120, that specify prescribed operating powers for one or more channels and, hence, corresponding radiant output powers for the light generated by the respective channels. By varying the prescribed operating powers for one or more channels (e.g., pursuant to different instructions or lighting commands), different perceived colors and brightness of light may be generated by the lighting unit.

In one embodiment of the lighting unit 100, as mentioned above, one or more of the light sources 104A, 104B, 104C, and 104D shown in FIG. 1 may include a group of multiple LEDs or other types of light sources (e.g., various parallel and/or serial connections of LEDs or other types of light sources) that are controlled together by the processor 102. Additionally, it should be appreciated that one or more of the light sources may include one or more LEDs that are adapted to generate radiation having any of a variety of spectra (i.e., wavelengths or wavelength bands), including, but not limited to, various visible colors (including essentially white light), various color temperatures of white light, ultraviolet, or infrared. LEDs having a variety of spectral bandwidths (e.g., narrow band, broader band) may be employed in various implementations of the lighting unit 100.

In another aspect of the lighting unit 100 shown in FIG. 1, the lighting unit 100 may be constructed and arranged to produce a wide range of variable color radiation. For example, the lighting unit 100 may be particularly arranged such that the processor-controlled variable intensity (i.e., variable radiant power) light generated by two or more of the light sources combines to produce a mixed colored light (including essentially white light having a variety of color temperatures). In particular, the color (or color temperature) of the mixed colored light may be varied by varying one or more of the respective intensities (output radiant power) of the light sources (e.g., in response to one or more control signals output by the processor 102). Furthermore, the processor 102 may be particularly configured (e.g., programmed) to provide control signals to one or more of the light sources so as to generate a variety of static or time-varying (dynamic) multi-color (or multi-color temperature) lighting effects.

Thus, the lighting unit 100 may include a wide variety of colors of LEDs in various combinations, including two or more of red, green, and blue LEDs to produce a color mix, as well as one or more other LEDs to create varying colors and color temperatures of white light. For example, red, green and blue can be mixed with amber, white, UV, orange, IR or other colors of LEDs. Such combinations of differently colored LEDs in the lighting unit 100 can facilitate accurate reproduction of a host of desirable spectrums of lighting conditions, examples of which include, but are not limited to, a variety of outside daylight equivalents at different times of the day, various interior lighting conditions, lighting conditions to simulate a complex multicolored background, and the like. Other desirable lighting conditions can be created by removing particular pieces of spectrum that may be specifically absorbed, attenuated or reflected in certain environments. Water, for example tends to absorb and attenuate most non-blue and non-green colors of light, so underwater applications may benefit from lighting conditions that are tailored to emphasize or attenuate some spectral elements relative to others.

As shown in FIG. 1, the lighting unit 100 also may include a memory 114 to store various information. For example, the memory 114 may be employed to store one or more lighting commands or programs for execution by the processor 102 (e.g., to generate one or more control signals for the light sources), as well as various types of data useful for generating variable color radiation (e.g., calibration information, discussed further below). The memory 114 also may store one or more particular identifiers (e.g., a serial number, an address, etc.) that may be used either locally or on a system level to identify the lighting unit 100. In various embodiments, such identifiers may be pre-programmed by a manufacturer, for example, and may be either alterable or non-alterable thereafter (e.g., via some type of user interface located on the lighting unit, via one or more data or control signals received by the lighting unit, etc.). Alternatively, such identifiers may be determined at the time of initial use of the lighting unit in the field, and again may be alterable or non-alterable thereafter.

In another aspect, as also shown in FIG. 1, the lighting unit 100 optionally may include one or more user interfaces 118 that are provided to facilitate any of a number of user selectable settings or functions (e.g., generally controlling the light output of the lighting unit 100, changing and/or selecting various pre-programmed lighting effects to be generated by the lighting unit, changing and/or selecting various parameters of selected lighting effects, setting particular identifiers such as addresses or serial numbers for the lighting unit, etc.). In various embodiments, the communication between the user interface 118 and the lighting unit may be accomplished through wire or cable, or wireless transmission.

In one implementation, the processor 102 of the lighting unit monitors the user interface 118 and controls one or more of the light sources 104A, 104B, 104C and 104D based at least in part on an user's operation of the interface. For example, the processor 102 may be configured to respond to operation of the user interface by originating one or more control signals for controlling one or more of the light sources. Alternatively, the processor 102 may be configured to respond by selecting one or more pre-programmed control signals stored in memory, modifying control signals generated by executing a lighting program, selecting and executing a new lighting program from memory, or otherwise affecting the radiation generated by one or more of the light sources.

In particular, in one implementation, the user interface 118 may constitute one or more switches (e.g., a standard wall switch) that interrupt power to the processor 102. In one aspect of this implementation, the processor 102 is configured to monitor the power as controlled by the user interface, and in turn control one or more of the light sources based at least in part on a duration of a power interruption caused by operation of the user interface. As discussed above, the processor may be particularly configured to respond to a predetermined duration of a power interruption by, for example, selecting one or more pre-programmed control signals stored in memory, modifying control signals generated by executing a lighting program, selecting and executing a new lighting program from memory, or otherwise affecting the radiation generated by one or more of the light sources.

FIG. 1 also illustrates that the lighting unit 100 may be configured to receive one or more signals 122 from one or more other signal sources 124. In one implementation, the processor 102 of the lighting unit may use the signal(s) 122, either alone or in combination with other control signals (e.g., signals generated by executing a lighting program, one or more outputs from an user interface, etc.), so as to control one or more of the light sources 104A, 104B and 104C in a manner similar to that discussed above in connection with the user interface.

Examples of the signal(s) 122 that may be received and processed by the processor 102 include, but are not limited to, one or more audio signals, video signals, power signals, various types of data signals, signals representing information obtained from a network (e.g., the Internet), signals representing one or more detectable/sensed conditions, signals from lighting units, signals consisting of modulated light, etc. In various implementations, the signal source(s) 124 may be located remotely from the lighting unit 100, or included as a component of the lighting unit. For example, in one embodiment, a signal from one lighting unit 100 could be sent over a network to another lighting unit 100.

Some examples of a signal source 124 that may be employed in, or used in connection with, the lighting unit 100 of FIG. 1 include any of a variety of sensors or transducers that generate one or more signals 122 in response to some stimulus. Examples of such sensors include, but are not limited to, various types of environmental condition sensors, such as thermally sensitive (e.g., temperature, infrared) sensors, humidity sensors, motion sensors, photosensors/light sensors (e.g., photodiodes, sensors that are sensitive to one or more particular spectra of electromagnetic radiation such as spectroradiometers or spectrophotometers, etc.), various types of cameras, sound or vibration sensors or other pressure/force transducers (e.g., microphones, piezoelectric devices), and the like.

Additional examples of a signal source 124 include various metering/detection devices that monitor electrical signals or characteristics (e.g., voltage, current, power, resistance, capacitance, inductance, etc.) or chemical/biological characteristics (e.g., acidity, a presence of one or more particular chemical or biological agents, bacteria, etc.) and provide one or more signals 122 based on measured values of the signals or characteristics. Yet other examples of a signal source 124 include various types of scanners, image recognition systems, voice or other sound recognition systems, artificial intelligence and robotics systems, and the like. A signal source 124 could also be a lighting unit 100, a processor 102, or any one of many available signal generating devices, such as media players, MP3 players, computers, DVD players, CD players, television signal sources, camera signal sources, microphones, speakers, telephones, cellular phones, instant messenger devices, SMS devices, wireless devices, personal organizer devices, and many others.

In one embodiment, the lighting unit 100 shown in FIG. 1 also may include one or more optical elements 130 to optically process the radiation generated by the light sources 104A, 104B, and 104C. For example, one or more optical elements may be configured so as to change one or both of a spatial distribution and a propagation direction of the generated radiation. In particular, one or more optical elements may be configured to change a diffusion angle of the generated radiation. In one aspect of this embodiment, one or more optical elements 130 may be particularly configured to variably change one or both of a spatial distribution and a propagation direction of the generated radiation (e.g., in response to some electrical and/or mechanical stimulus). Examples of optical elements that may be included in the lighting unit 100 include, but are not limited to, reflective materials, refractive materials, translucent materials, filters, lenses, mirrors, and fiber optics. The optical element 130 also may include a phosphorescent material, luminescent material, or other material capable of responding to or interacting with the generated radiation.

As also shown in FIG. 1, the lighting unit 100 may include one or more communication ports 120 to facilitate coupling of the lighting unit 100 to any of a variety of other devices. For example, one or more communication ports 120 may facilitate coupling multiple lighting units together as a networked lighting system, in which at least some of the lighting units are addressable (e.g., have particular identifiers or addresses) and are responsive to particular data transported across the network.

In particular, in a networked lighting system environment, as discussed in greater detail further below (e.g., in connection with FIG. 2), as data is communicated via the network, the processor 102 of each lighting unit coupled to the network may be configured to be responsive to particular data (e.g., lighting control commands) that pertain to it (e.g., in some cases, as dictated by the respective identifiers of the networked lighting units). Once a given processor identifies particular data intended for it, it may read the data and, for example, change the lighting conditions produced by its light sources according to the received data (e.g., by generating appropriate control signals to the light sources). In one aspect, the memory 114 of each lighting unit coupled to the network may be loaded, for example, with a table of lighting control signals that correspond with data the processor 102 receives. Once the processor 102 receives data from the network, the processor may consult the table to select the control signals that correspond to the received data, and control the light sources of the lighting unit accordingly.

In one aspect of this embodiment, the processor 102 of a given lighting unit, whether or not coupled to a network, may be configured to interpret lighting instructions/data that are received in a DMX protocol (as discussed, for example, in U.S. Pat. Nos. 6,016,038 and 6,211,626), which is a lighting command protocol conventionally employed in the lighting industry for some programmable lighting applications. For example, in one aspect, a lighting command in DMX protocol may specify each of a red channel command, a green channel command, and a blue channel command as eight-bit data (i.e., a data byte) representing a value from 0 to 255, wherein the maximum value of 255 for any one of the color channels instructs the processor 102 to control the corresponding light source(s) to operate at maximum available power (i.e., 100%) for the channel, thereby generating the maximum available radiant power for that color (such a command structure for an R-G-B lighting unit commonly is referred to as 24-bit color control). Hence, a command of the format [R, G, B]=[255, 255, 255] would cause the lighting unit to generate maximum radiant power for each of red, green and blue light (thereby creating white light).

It should be appreciated, however, that lighting units suitable for purposes of the present disclosure are not limited to a DMX command format, as lighting units according to various embodiments may be configured to be responsive to other types of communication protocols/lighting command formats so as to control their respective light sources. In general, the processor 102 may be configured to respond to lighting commands in a variety of formats that express prescribed operating powers for each different channel of a multi-channel lighting unit according to some scale representing zero to maximum available operating power for each channel.

In one embodiment, the lighting unit 100 of FIG. 1 may include and/or be coupled to one or more power sources 108. In various aspects, examples of power source(s) 108 include, but are not limited to, AC power sources, DC power sources, batteries, solar-based power sources, thermoelectric or mechanical-based power sources and the like. Additionally, in one aspect, the power source(s) 108 may include or be associated with one or more power conversion devices that convert power received by an external power source to a form suitable for operation of the lighting unit 100.

While not shown explicitly in FIG. 1, the lighting unit 100 may be implemented in any one of several different structural configurations according to various embodiments of the present disclosure. Examples of such configurations include, but are not limited to, an essentially linear or curvilinear configuration, a circular configuration, an oval configuration, a rectangular configuration, combinations of the foregoing, various other geometrically shaped configurations, various two or three dimensional configurations, and the like.

A given lighting unit also may have any one of a variety of mounting arrangements for the light source(s), enclosure/housing arrangements and shapes to partially or fully enclose the light sources, and/or electrical and mechanical connection configurations. In particular, a lighting unit may be configured as a replacement or "retrofit" to engage electrically and mechanically in a conventional socket or fixture arrangement (e.g., an Edison-type screw socket, a halogen fixture arrangement, a fluorescent fixture arrangement, etc.).

Additionally, one or more optical elements as discussed above may be partially or fully integrated with an enclosure/housing arrangement for the lighting unit. Furthermore, a given lighting unit optionally may be associated with (e.g., include, be coupled to and/or packaged together with) various other components (e.g., control circuitry such as the processor and/or memory, one or more sensors/transducers/signal sources, user interfaces, displays, power sources, power conversion devices, etc.) relating to the operation of the light source(s).

Figure 2:
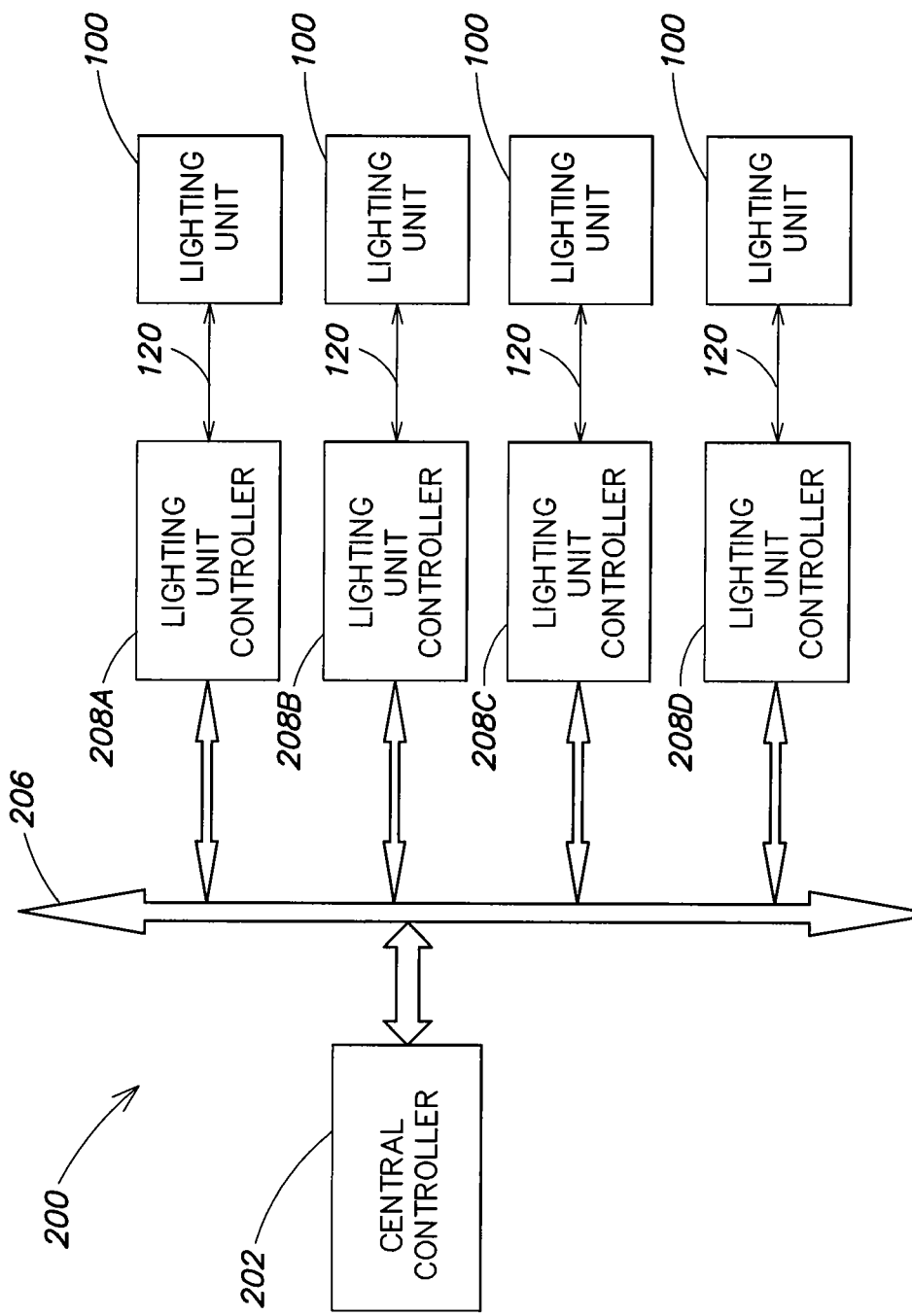
FIG. 2 is a diagram illustrating a networked lighting system according to one embodiment of the disclosure.

FIG. 2 illustrates an example of a networked lighting system 200 according to one embodiment of the present disclosure. In the embodiment of FIG. 2, a number of lighting units 100, similar to those discussed above in connection with FIG. 1, are coupled together to form the networked lighting system. It should be appreciated, however, that the particular configuration and arrangement of lighting units shown in FIG. 2 is for purposes of illustration only, and that the disclosure is not limited to the particular system topology shown in FIG. 2.

Additionally, while not shown explicitly in FIG. 2, it should be appreciated that the networked lighting system 200 may be configured flexibly to include one or more user interfaces, as well as one or more signal sources such as sensors/transducers. For example, one or more user interfaces and/or one or more signal sources such as sensors/transducers (as discussed above in connection with FIG. 1) may be associated with any one or more of the lighting units of the networked lighting system 200. Alternatively (or in addition to the foregoing), one or more user interfaces and/or one or more signal sources may be implemented as "stand alone" components in the networked lighting system 200. Whether stand alone components or particularly associated with one or more lighting units 100, these devices may be "shared" by the lighting units of the networked lighting system. Stated differently, one or more user interfaces and/or one or more signal sources such as sensors/transducers may constitute "shared resources" in the networked lighting system that may be used in connection with controlling any one or more of the lighting units of the system.

As shown in the embodiment of FIG. 2, the lighting system 200 may include one or more lighting unit controllers (hereinafter "LUCs") 208A, 208B, 208C, and 208D, wherein each LUC is responsible for communicating with and generally controlling one or more lighting units 100 coupled to it. Although FIG. 2 illustrates one lighting unit 100 coupled to each LUC, it should be appreciated that the disclosure is not limited in this respect, as different numbers of lighting units 100 may be coupled to a given LUC in a variety of different configurations (serially connections, parallel connections, combinations of serial and parallel connections, etc.) using a variety of different communication media and protocols.

In the system of FIG. 2, each LUC in turn may be coupled to a central controller 202 that is configured to communicate with one or more LUCs. Although FIG. 2 shows four LUCs coupled to the central controller 202 via a generic connection 204 (which may include any number of a variety of conventional coupling, switching and/or networking devices), it should be appreciated that according to various embodiments, different numbers of LUCs may be coupled to the central controller 202. Additionally, according to various embodiments of the present disclosure, the LUCs and the central controller may be coupled together in a variety of configurations using a variety of different communication media and protocols to form the networked lighting system 200. Moreover, it should be appreciated that the interconnection of LUCs and the central controller, and the interconnection of lighting units to respective LUCs, may be accomplished in different manners (e.g., using different configurations, communication media, and protocols).

For example, according to one embodiment of the present disclosure, the central controller 202 shown in FIG. 2 may by configured to implement Ethernet-based communications with the LUCs, and in turn the LUCs may be configured to implement DMX-based communications with the lighting units 100. In particular, in one aspect of this embodiment, each LUC may be configured as an addressable Ethernet-based controller and accordingly may be identifiable to the central controller 202 via a particular unique address (or a unique group of addresses) using an Ethernet-based protocol. In this manner, the central controller 202 may be configured to support Ethernet communications throughout the network of coupled LUCs, and each LUC may respond to those communications intended for it. In turn, each LUC may communicate lighting control information to one or more lighting units coupled to it, for example, via a DMX protocol, based on the Ethernet communications with the central controller 202.

More specifically, according to one embodiment, the LUCs 208A, 208B, and 208C shown in FIG. 2 may be configured to be "intelligent" in that the central controller 202 may be configured to communicate higher level commands to the LUCs that need to be interpreted by the LUCs before lighting control information can be forwarded to the lighting units 100. For example, a lighting system operator may want to generate a color changing effect that varies colors from lighting unit to lighting unit in such a way as to generate the appearance of a propagating rainbow of colors ("rainbow chase"), given a particular placement of lighting units with respect to one another. In this example, the operator may provide a simple instruction to the central controller 202 to accomplish this, and in turn the central controller may communicate to one or more LUCs using an Ethernet-based protocol high level command to generate a "rainbow chase." The command may contain timing, intensity, hue, saturation or other relevant information, for example. When a given LUC receives such a command, it may then interpret the command and communicate further commands to one or more lighting units using a DMX protocol, in response to which the respective sources of the lighting units are controlled via any of a variety of signaling techniques (e.g., PWM).

It should again be appreciated that the foregoing example of using multiple different communication implementations (e.g., Ethernet/DMX) in a lighting system according to one embodiment of the present disclosure is for purposes of illustration only, and that the disclosure is not limited to this particular example.

From the foregoing, it may be appreciated that one or more lighting units as discussed above are capable of generating highly controllable variable colored light over a wide range of colors, as well as variable color temperature white light over a wide range of color temperatures.

As noted earlier, according to various embodiments of the present disclosure, one environment in which controlled lighting and lighting networks as described above may be effectively employed is a personal workspace, which generally refers to any partitioned area in which an individual may perform various tasks with minimal distractions. Some examples of a personal workspace include, but are not limited to, a cubicle, a library carrel, a laboratory, a dormitory room, a hotel room, an airplane seat and a train compartment. Various lighting concepts, based at least in part on the lighting units described above, may be applied to generally improve a personal workspace or an environment including multiple workspaces, such as by enhancing office ergonomics, providing an aesthetically pleasing environment, improving health, safety, or general well-being, providing information via lighting, and generally facilitating the customization of a workspace environment based on occupant preferences.

A personal workspace may require multiple lighting needs, and each of these needs may vary depending on the task at hand, the time of day (e.g. day or night), the season of the year, and even from person-to-person. For example, one workspace occupant may enjoy working in a brightly lit environment, and thus configure her workspace to exude a high level of ambient light. A different occupant, however, may wish to eliminate ambient light altogether; she may instead rely solely on task lighting focused directly on her work surface.

Generally, "illumination" refers to light having a sufficient brightness to effectively facilitate visibility in an interior or exterior space. Illumination also may be considered as "ambient light," which typically refers to light that generally is perceived indirectly and that may be, for example, reflected off of one or more of a variety of intervening surfaces in a given environment before being perceived in whole or in part by one or more individuals in the environment. For example, a floor lamp may direct light upwards at a ceiling in a workspace so as to provide ambient light or illumination. In addition, illumination may be provided by a light shining down from an overhead lighting unit. Illumination may be provided in any number of brightness levels or colors, although essentially white light, having any of a variety of color temperatures, constitutes perhaps the most common form of illumination, or ambient light.

"Task lighting" generally relates to somewhat more concentrated light in order to accentuate one or more specific target objects or areas. Areas in which intricate detailed work is performed, for example, may require task lighting. A common example of task lighting includes a conventional desk lamp found in most offices. Like illumination, task lighting often is perceived indirectly, as reflected from target objects or areas. Similarly, task lighting may be provided in any number of levels of brightness or colors, including essentially white light having a variety of color temperatures. Examples of task lighting may include light generated by a free standing desk lamp, or by one or more light sources that are mounted underneath a cabinet, a shelf, a desk or elsewhere in a workspace, and which is directed toward one or more target objects or areas.

In a workspace, one or both of illumination and task lighting additionally may function, at least in part, as decorative or aesthetic lighting. "Decorative lighting" generally refers to light that is generated to provide a pleasing effect in the workspace environment, and serves in addition to, or as an alternative to, the utilitarian purpose of using lighting to enhance visibility. As described above, decorative lighting may be provided in any number of colors, including white, and may be static or dynamic (multi-color/time-varying) in nature and/or include patterns or designs of multiple colors of light generated essentially simultaneously or in sequence. Some examples of decorative lighting, as discussed in further detail below, include "accent lighting" (e.g., highlighting the outline of objects, structural/architectural features, etc.), and lighting provided by geometric light panels or "light tiles."

According to various embodiments, any one or more of illumination, task lighting and decorative lighting can be controlled to convey information via generated light. In particular, one or more perceivable characteristics of light, such as color, brightness, or time-varying patterns of color and brightness, may represent some type of information that may be relevant to a workspace occupant. As discussed in greater detail below in connection with FIGS. 8 and 9, examples of information conveyed by lighting in a workspace may include, but is not limited to, location of one or more persons or groups of people arranged by workplace function or "department" (e.g., accounting=blue; information technology=green), safety issues (e.g., fire alarms), navigation or "wayfinding" in the general environment surrounding the workspace, status of various events in the workplace (e.g., incoming phone calls and/or email, presence or absence of occupant, meeting reminders), status of various events of interest to the workspace occupant, various calendar events having a particular date or time, information obtained from the Internet (e.g., weather conditions, news events, changes in stock prices, etc.), or information related to virtually any other aspect of a workspace environment.

Figure 3:
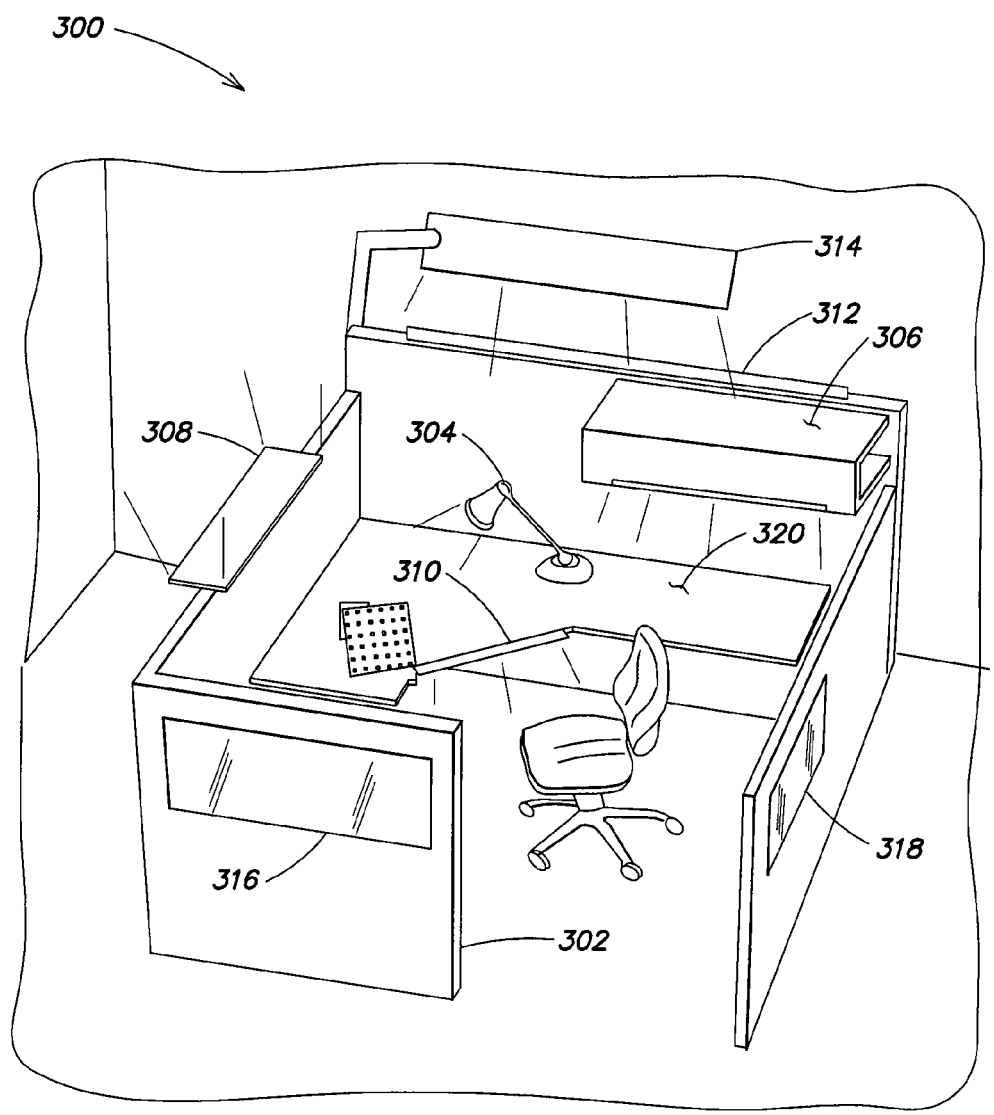
FIG. 3 illustrates a personal workspace and examples of lighting units for the workspace, according to one embodiment of the disclosure.

FIG. 3 illustrates an exemplary personal workspace 300 according to one embodiment of the present disclosure. The workspace 300 may include one or more dividers 302, one or more LED-based lighting units 304, 306, 308, 310, 312, 314, 316 and 318, and one or more work surfaces 320. For purposes of the present disclosure, a "divider" refers to some structure that provides at least one boundary for the workspace. Hence, in this sense, the words "partition" and "wall" similarly may be employed as alternatives to "divider" to convey a workspace boundary. Accordingly, while a cubicle-like workspace is illustrated in FIG. 3 (and in the following figures), it should be appreciated that the principles described herein may be readily applied to other exemplary workspaces including, but not limited to, a "fully-enclosed" office or workspace (with floor-to-ceiling walls), a shared workspace (e.g., a "fully enclosed" workspace containing multiple cubicles), a library carrel, a dormitory work area, a single desk, a pod, a board room, a videoconferencing facility, a waiting room, a reception area, a workspace in a hotel environment, and the like.

In one aspect of the workspace shown in FIG. 3, one or more of the LED-based lighting units may be similar to the lighting unit 100 discussed above in connection with FIGS. 1 and 2. In particular, various LED-based lighting units deployed in the workspace 300 may be addressable and/or controllable to generate variable color light and/or variable color-temperature white light.

As illustrated in FIG. 3, the workspace may include one or more free standing task lights 304 placed on top of the work surface 320. Additionally, one or more down-lighting units 306 may be mounted under a cabinet or shelf to provide task lighting or illumination to a work area. One or more such down-lighting units similarly may be mounted under a removable tray, so as to light material on another similar tray below the lighting unit(s). One or more up-lighting units 308 may be mounted on top of one or more of the dividers 302 in order to provide some degree of upwardly-directed general illumination as well as decorative lighting in the workspace. For example, such up-lighting units 308 may provide diffused workspace lighting by directing light upward and off a diffusing surface such as the ceiling (e.g., to create soft "shadowy" ambient or decorative light).

The workspace shown in FIG. 3 also may include one or more "accent" lighting units 312, disposed for example along a ledge of one or more partitions or dividers 302 or otherwise outlining and/or highlighting some structural or architectural feature of the workspace 300, to provide decorative lighting and/or illumination. One or more overhead lighting units 314 also may be provided in connection with, or proximate to, the workspace 300, to provide workspace-centric ambient light or illumination. While the overhead lighting unit 314 is depicted in FIG. 3 as coupled to a divider or wall forming the workspace, it should be appreciated that in other implementations one or more detached overhead lighting fixtures (e.g., disposed in a ceiling above the workspace, as discussed below in connection with FIGS. 7A and 7B) may serve to provide ambient lighting or illuminations in the workspace.

As also shown in FIG. 3, one or more geometric panel lighting units 316, or "tile" lighting units, may be mounted to one or more dividers 302 or any other surface within the workspace 300. Such tile lighting units may be employed to generate different static colors of light to provide a "wall of light," as well as one or more of dynamic multicolor patterns of light, text messages, low resolution graphics, and video. Examples of such geometric panel lighting units are discussed, for example, in U.S. Non-provisional Application Publication No. US-2005-0116667-A1, entitled "Tile Lighting Methods and Apparatus," hereby incorporated by reference. In one aspect, the panel lighting unit 316 may be formed of a polycarbonate or other like material that can be edge lit with one or more LED-based light sources to glow with a controllable color. The workspace 300 also may include one or more lighted "privacy windows" 318 that are disposed within a portion of the dividers 302. Examples of lighted privacy windows according to different embodiments of the present disclosure are discussed in greater detail below in connection with FIG. 4.

The work surface 320 shown in FIG. 3 may be any conventional work surface, and also may include one or more light sources integrated into or otherwise attached to the top or bottom surface thereof. For example, one or more second down-lighting units 310 may be coupled to the bottom of the work surface 320 to provide better visibility when accessing power or network interfaces beneath the work surface 320, or when trying to locate items such as books, files, or waste/recycling receptacles located beneath the work surface 320.

While the workspaces discussed above may be intentionally designed in some aspects to minimize external distractions, they may in other aspects unduly limit or impede person-to-person communication among employees. This phenomenon has been noted to have potentially adverse effects on company-specific corporate cultures, morale, as well as productivity and efficiency in the workplace. Accordingly, one embodiment of the present disclosure is directed to a lighted privacy window that may be employed in the workspace environment to afford some degree of controllable privacy in the workspace, while at the same time providing a complimentary controllable lighting component to one or more other lighting units in the workspace.

Presently, some advanced conference rooms in the "high end" of office environments have windows or doors that transition between transparency to opacity (i.e., public disclosure to full privacy) to facilitate different privacy preferences in these environments. Other technologies relating to variable transparencies of windows are concerned with energy efficiency issues. Some examples of variable transparency windows currently contemplated in the relevant arts include electrochromic windows, liquid crystal windows, thermochromic windows, and photochromic windows.

In an electrochromic window, a thin multi-layer assembly is sandwiched between traditional pieces of glass. The multi-layer assembly includes two outside layers of transparent electronic conductors (e.g., Indium Tin Oxide) which in turn sandwich a counter-electrode layer and an electrochromic layer, with an ion conductor layer in-between the counter-electrode and electrochromic layers. When a low voltage (one to three volts) is applied across the transparent conductors, moving ions from the counter-electrode to the electrochromic layer cause the assembly to change color. Reversing the applied voltage moves ions from the electrochromic layer back to the counter-electrode layer, restoring the device to its previous transparent state. In this manner, an electrochromic window can change from clear to fully darkened or any level of tint in-between. These windows have been suggested for cars, where with a touch of a switch (controlling the voltage applied to the window) the driver can tint a mirror or sunroof. In buildings, electrochromic windows allow for privacy, and also may be useful for cutting down glare and warding off increases in solar heat.

In a liquid crystal window, two layers of film enclose a layer of tiny liquid crystals. This assembly is laminated between two pieces of heat-treated glass. Both faces of the film are covered with a transparent, electrically conductive metal coating, which are in turn coupled to a voltage source. With no voltage applied, the liquid crystals are randomly scattered. Thus, light entering the surrounding glass does not have a "clear path" out of the window (it is scattered by the random arrangement of liquid crystals), and the window appears as translucent milky white. When an voltage is applied between the two conductive coatings, the liquid crystals align neatly and allow light to pass essentially directly through the liquid crystal layer, thereby rendering the window significantly more transparent (e.g., slightly hazy, but essentially clear).

In a thermochromic window, heat causes the window to alter its properties. In particular, in response to changes in the ambient temperature, clear thermochromic glazing becomes diffused. Several thermochromic technologies presently are being explored, but gel-based coatings seem to be the most promising. "Cloud Gel," a product now on the market, is a thin plastic film that can be incorporated into almost any window assembly. The response temperatures of "Cloud Gel" can be adjusted depending on need and location. In addition to automatically changing from clear to diffused in response to heat, the glazing also turns white and reflective (i.e., virtually opaque), thereby reducing the transmission of solar heat.

Still in a development stage, photochromic windows respond to changes in light, much like sunglasses that darken when transitioning from a dimly lit setting to a bright light environment. For example, a photochromic window would be less transparent as more light irradiates the window; in this manner, photochromic windows work well to reduce glare from the sun. While the technology underlying photochromic widows works well on small, eyeglass-sized pieces of glass, there are some challenges however in implementing this technology on a large-scale, commercial level for window-sized pieces.

While the foregoing examples offer a variety of possibilities for providing some degree of privacy in a workspace, perhaps the most applicable include liquid crystal and electrochromic windows due to their controllability based on an applied electric signal. In one embodiment of the present disclosure, yet another alternative of a controllable privacy window is considered, in which a controllable variable transparency of the window relates significantly to a controllable light source that illuminates the window.

Figure 4:
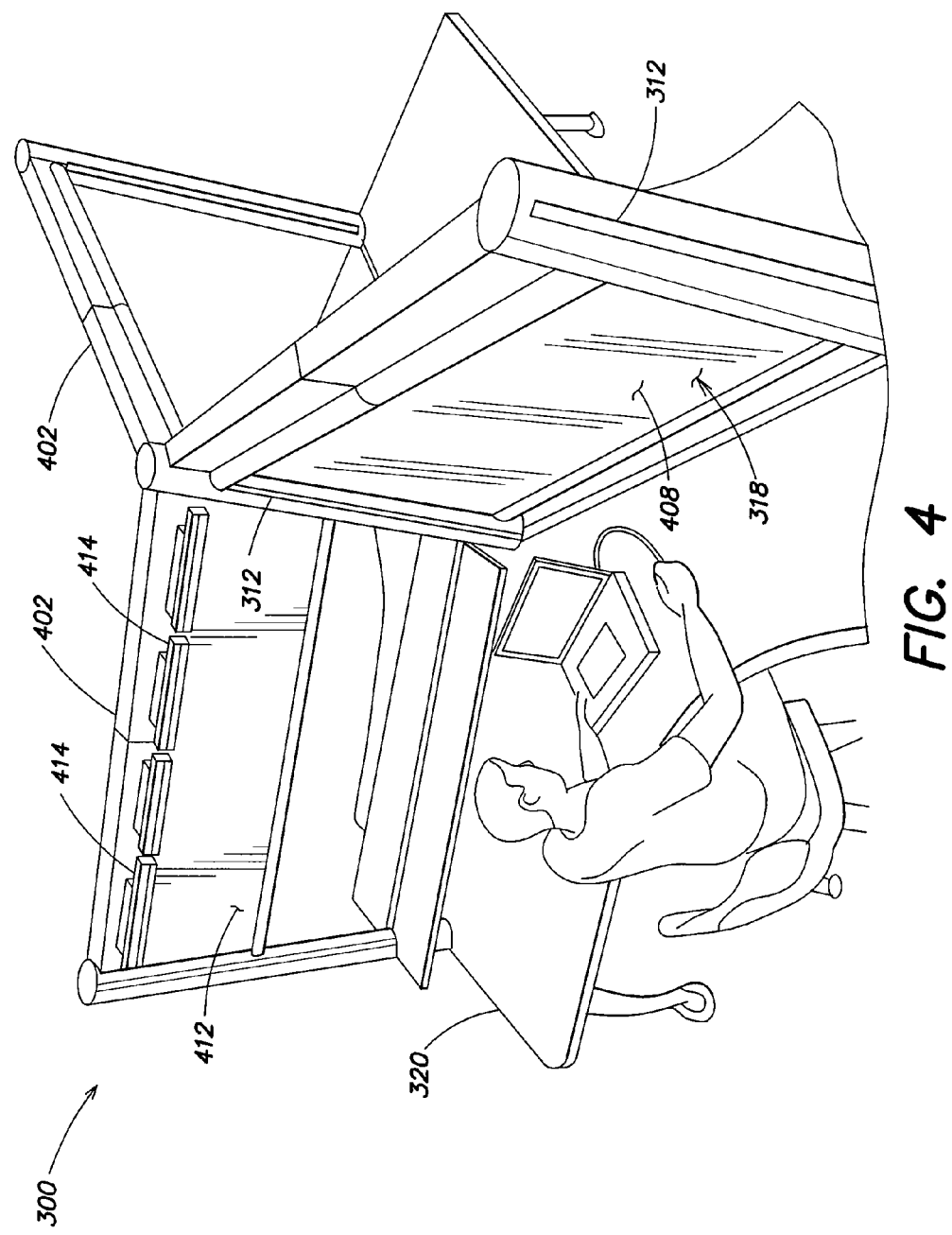
FIG. 4 illustrates a personal workspace and examples of lighting units for the workspace, according to another embodiment of the disclosure.

For example, in connection with lighted components that may affect privacy or transparency in the workspace, FIG. 4 shows another exemplary personal workspace 300 that includes various examples of lighted privacy windows or screens, according to embodiments of the present disclosure. In one aspect depicted in FIG. 4, the workspace 300 may include dividers or partitions 402 which, unlike the dividers shown in FIG. 3, rest on a work surface 320 rather than the floor. However, whether a divider or partition for a workspace rests on a work surface or on a floor, the divider or partition generally may be configured to include one or more privacy windows or screens as discussed in detail below.

In one embodiment, as shown in FIG. 4, a lighted privacy window 318 may comprise an at least partially transparent panel 408 within a divider 302 or 402. The panel 408 may be constructed in a manner such that when the lighted privacy window 318 is in an "on-state," the panel 408 is illuminated from within with light generated by one or more LED-based lighting units integrated in some manner with the panel, thereby becoming opaque and affording increased privacy. In one aspect, significant opacity results from reflections of the illumination within the panel 408 due to perturbations in or on the surface of the panel 408 that serve as scattering centers for the generated light. For example, a surface of the panel 408 may be laminated or physically agitated (e.g., via sandblasting, etching, acid, laser beam, applied frit, etc.) in order to generate the surface perturbations. When the privacy window 318 is in an "off-state," the illumination generated by the one or more LED-based sources integrated with the panel is extinguished and the panel 408 becomes appreciably transparent, thereby facilitating some degree of viewing into and out of the workspace.

The workspace 300 shown in FIG. 4 also may include one or more flexible translucent mesh or halftone screens 412, which may be raised and lowered by the occupant to also serve as a type of privacy device. One or more "cove" lighting units 414 may be employed in the workspace to externally illuminate the mesh screen 412 in a manner that increases opacity of the screen. Thus, the occupant may control the desired level of privacy by raising and lowering the translucent mesh screen 412 and controlling the light generated by the cove lighting units in a manner similar to that discussed above in connection with FIGS. 1 and 2 (further details of lighting control in the workspace are discussed in detail further below in connection with FIG. 6).

The concept of using lighting for controllable privacy purposes may be applied to one or more of the examples of conventional privacy windows, such as electrochromic windows, liquid crystal windows, and others. For example, in a liquid crystal window (which is milky white when in an unpowered state), the window's opaque state may be augmented with variable colored lighting from one or more internally and/or externally disposed LED-based light sources. In particular, the randomly arranged liquid crystals in the unpowered state may serve as scattering centers for light provided by one or more LED-based sources, in a manner similar to that discussed above in connection with the lighted privacy window 318. In one exemplary implementation involving both privacy-related and decorative features, a liquid crystal based privacy window may be fabricated using die-cut patterns of a liquid crystal film that may be electrically connected with a transparent conductive coating (e.g., Indium Tin Oxide) to provide various types of "opacity patterns" in the window, rather than a continuously opaque window in an unpowered state. When power is applied to such a window, the patterns "disappear." Used in connection with lighting in either the powered or unpowered state, a variety of both decorative and utilitarian functions may be realized. In another exemplary implementation involving electrochromic windows, variable color or color temperature lighting used in connection with these windows may be employed to vary the apparent color of the electrochromic layer due to metamorism (apparent shifting of colors under different lighting conditions).

While not shown explicitly in FIG. 4, in another embodiment a vertical work surface such as a white board, black board, bulletin board, or the like may be employed instead of, or in addition to, the translucent mesh screen 412 shown in FIG. 4. One or more cove lighting units 414 similarly may be used in combination with a white board or other writing surface to create various lighting effects (e.g., based on the use of different color markers or pens which reflect differently under different lighting conditions).

As discussed initially in connection with FIG. 3, in yet another aspect of the workspace shown in FIG. 4, one or more accent lighting units 312 may be employed and configured to provide a variety of aesthetic, decorative and informational functions. Recall that in the workspace 300 shown in FIG. 3, an accent lighting unit 312 is disposed along a ledge of one or more partitions or dividers 302 to provide decorative lighting and/or illumination. In a similar fashion, in the workspace shown in FIG. 4, one or more accent lighting units 312 may be attached to or integrally formed along a vertical length of the divider 402 and configured to provide a variety of changing colors and patterns to provide decorative lighting in the workspace. In other embodiments, one or more accent lighting units 312 may be placed within a given workspace in a variety of manners so as to accentuate or highlight one or more structural or architectural features of the workspace.

In addition to the various lighting units explicitly indicated in FIGS. 3 and 4, lighting units also may be placed in, coupled to or otherwise integrated with other locations or articles within a given workspace. For example, chairs, paper trays, bookshelves, doors, computer-related components such as keyboards or monitor/display housings, telephones, etc., may be associated in some manner with one or more controllable lighting units as described herein. For example, a computer monitor may include a lighting unit to illuminate a keyboard or one or more "internal" lighting units to illuminate the monitor housing itself from within the monitor, or a bookshelf may provide supplemental illumination for a telephone keypad. Again, a variety of lighting units may be employed in a workspace and variably configured to customize a workspace environment to personal lighting preferences.

As discussed above in connection with FIG. 2, multiple lighting units disposed in a variety of arrangements in connection with a workspace may be configured as a networked lighting system to facilitate a wide range of controllable lighting functions. In general, networked lighting system implementations require various support components, such as one or more power supplies (e.g., to convert conventional AC line voltages to suitable DC voltages for operating one or more lighting units), and data connections to support communication throughout the network. With reference again to FIG. 2, some exemplary implementations also may require one or more lighting unit controllers or "LUCs" that are configured to control one or more lighting units (e.g., which may be arranged as sub-groups) constituting the network.

Accordingly, other embodiments of the present disclosure are directed to aspects of workspace infrastructure that incorporate various support components to facilitate implementation and control of a networked lighting system. In one exemplary embodiment, support components for networked lighting systems, including convenient power supply arrangements, are disposed in or otherwise integrated with one or more dividers or partitions of a personal workspace in a manner that preserves overall aesthetics in the workspace, affords convenient access to power and/or data resources, and allows for modular workspace construction to facilitate mobility and re-configurability.

Figure 5:
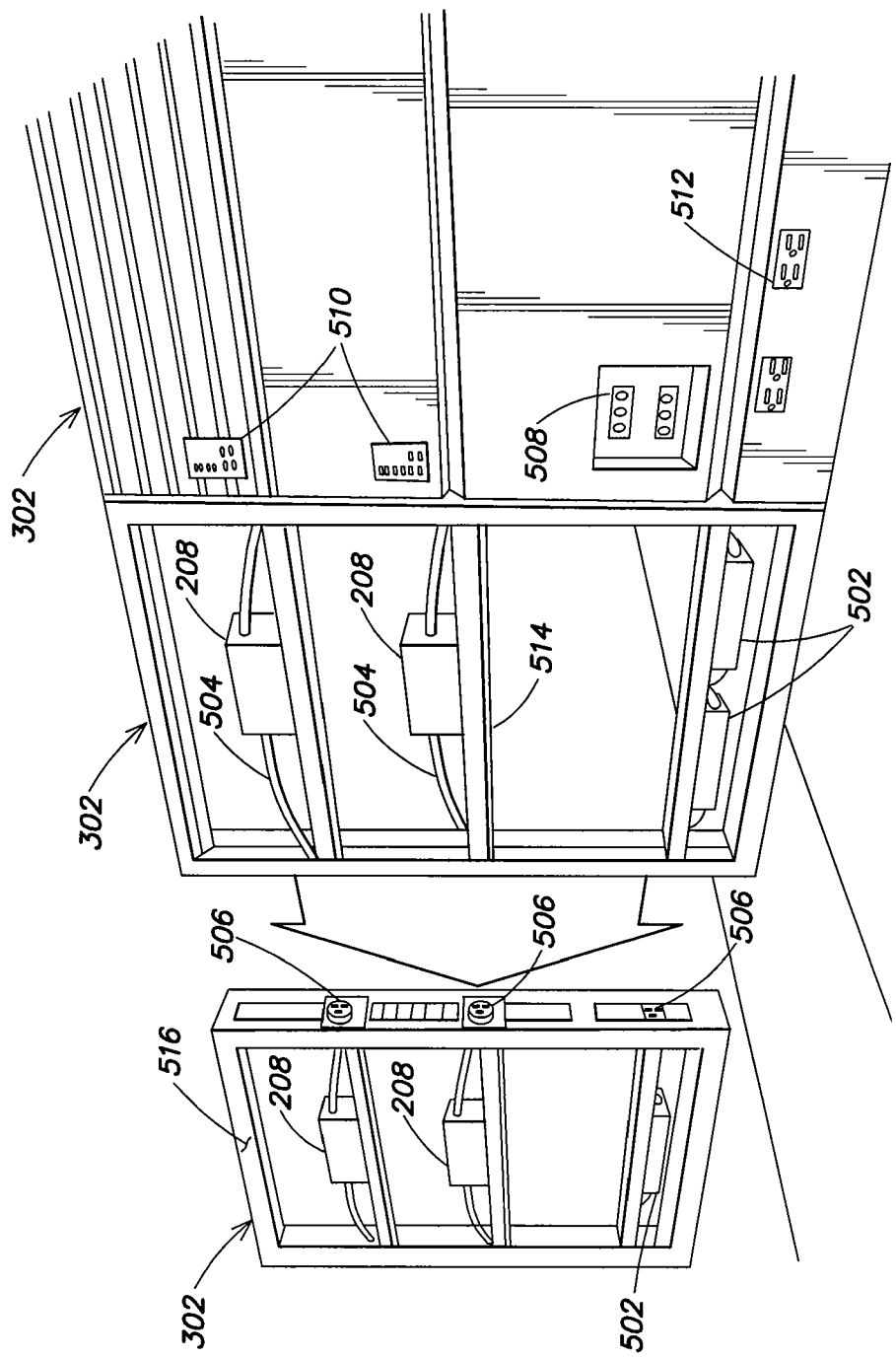
FIG. 5 shows an exemplary workspace dividers or partition including components relating to lighting in the workspace, according to one embodiment of the disclosure.

FIG. 5 provides an internal view of the dividers 302 originally shown in FIG. 3, according to one embodiment of the present disclosure. In various aspects shown in FIG. 5, components disposed within the dividers 302, one or more surface-access components, and the construction of the dividers themselves, provide an electro-mechanical infrastructure for the networked lighting systems described herein including control facilities, mounting interfaces for individual lighting units, and delivery of power and data.

As illustrated in FIG. 5, a frame 516 of the dividers generally includes one or more mechanical supports 514 on which one or more components may be mounted, as well as electrical interconnections 506 for interconnecting power and/or data between dividers. For example, one or more dividers 302 may include one or more power transformers 502, one or more LUCs 208, and data cables 504 disposed within an interior portion of the divider frame 516. In addition to the cables 504 shown in FIG. 5 relating specifically to lighting control, the dividers also may include any wiring for power or data that might be generally useful in an enclosed personal workspace, including cabling for Ethernet networks, digital or analog telephony networks, and HVAC systems, for example.

In one aspect, various mating mechanical and electrical interconnecting power and/or data arrangements may be employed to couple individual dividers, as indicated schematically by the arrow between the left-most and center divider depicted in FIG. 5. In FIG. 5, the right-most divider is illustrated with exemplary "finished" surfaces covering the internally disposed components, through which one or more power connections or AC outlets 512, data connections 508, or user-interface controls 510 may be accessible.

The dividers 502 depicted in FIG. 5 generally may reflect any customized partitioning structure to accommodate lighting networks that may be useful in an enclosed personal workspace. Dividers 502 including lighting network components also may be implemented as permanent installations or semi-permanent installations used in an original construction or build out. Additionally, the dividers 502 may be configured as sliding or collapsing walls used, for example, to separate a large conference room into a number of smaller conference rooms on a temporary basis.

Having discussed various types of workspace lighting, arrangements of lighting units to provide workspace lighting, and various components and infrastructure to support workspace lighting and other functions, other embodiments of the present disclosure are directed to configuring various aspects of a workspace in a customized manner. For example, in one embodiment, the occupant may personalize the workspace by controlling the lighting within the personal workspace. In this manner, the occupant may control any number of characteristics associated with the lighting, including but not limited to, changing the color of the light, changing the color temperature of white light, generating dynamic lighting effects, and associating light characteristics (e.g., pattern or color) with informational content (e.g., providing event or status indication via lighting). In other embodiments, the occupant may customize the personal workspace by flexibly arranging various electrical components and appliances, including the locations of at least some lighting units, based on convenient power distribution arrangements. Each of these aspects of workspace customization, i.e., lighting control and flexible arrangement of electrical components and appliances, is discussed in turn below.

Figure 6:
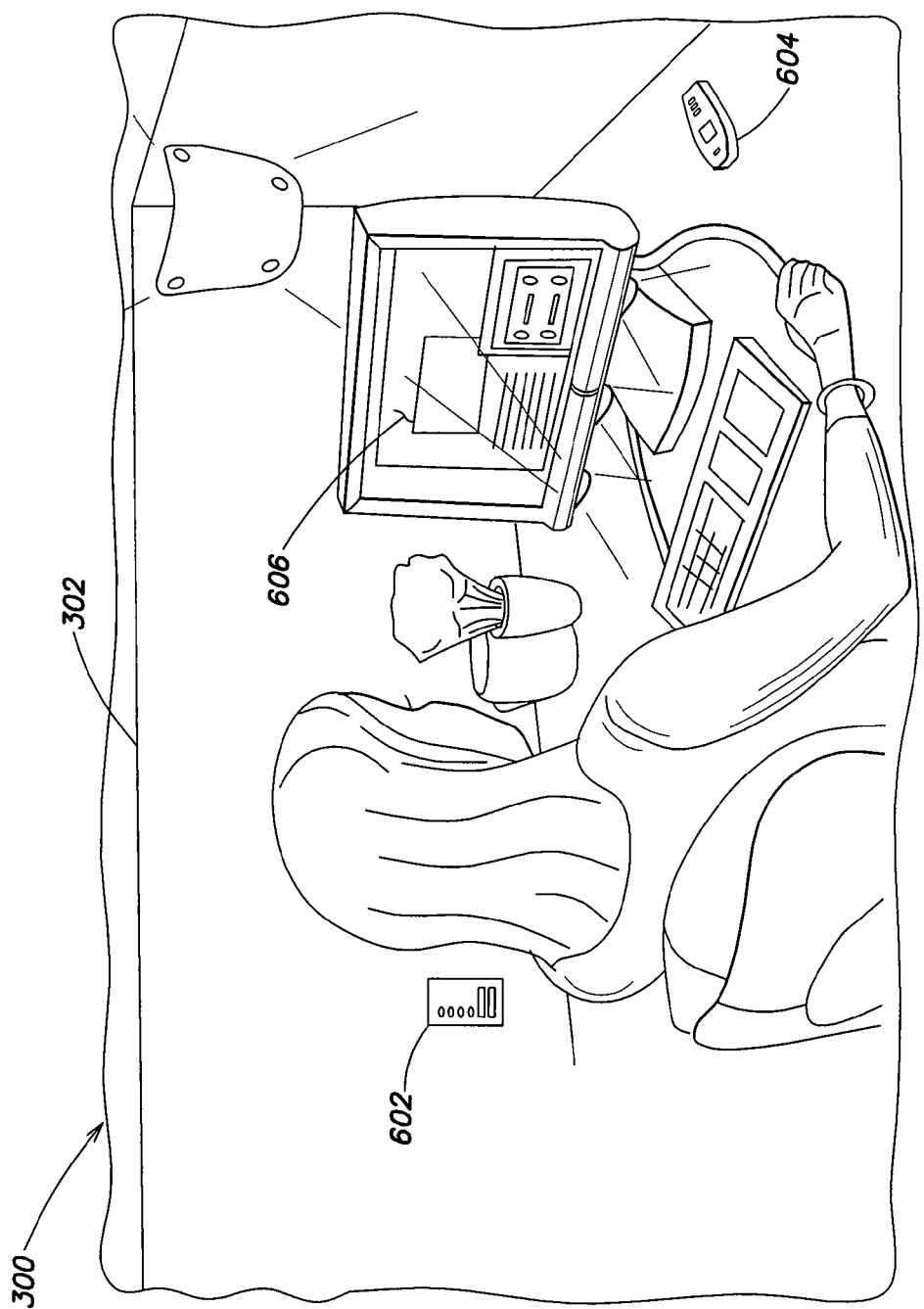
FIG. 6 illustrates examples of user-interfaces to allow a workspace occupant to customize various aspects of workspace lighting, according to different embodiments of the disclosure.

FIG. 6 illustrates a close-up view of an occupant within a workspace 300, in which different examples of user-interfaces are depicted to afford the occupant control over workspace lighting, according to various embodiments of the disclosure. For example, the occupant may wish to control the color of light, the color temperature of white light, and/or the brightness of light generated by one or more lighting units within the workspace. With reference again to FIGS. 3 and 4, the occupant further may wish to control the content displayed (e.g., static or dynamic light patterns and effects, text messages, graphics, video, etc.) by one or more geometric panel or "tile lighting" units 316 disposed in the workspace, as well as the state/color of one or more privacy windows 318 or privacy screens 412 associated with the workspace. The occupant may want to control any of these lighting units individually, or groups of lighting units in concert to create some type of coordinated, customized lighting condition in the workspace.

Accordingly, in different aspects, lighting control may range from a relatively straightforward manual setting/control of any single lighting unit in the workspace or group of lighting units, to a sophisticated lighting control based on a graphical user interface (GUI) and software-based lighting programs, in which the occupant may set or select various user-definable parameters of lighting conditions in the workspace. For example, in one implementation, user-defined lighting parameters may be specified for lighting conditions generated by every lighting unit in a given workspace, and these user-defined parameters may be stored on one or more computers or servers in the workspace environment and recalled on demand, in response to the execution of one or more lighting programs, and/or in response to one or more sensed environmental conditions or events related to the workspace.

With respect to manual control, any of the lighting units described herein may be controlled by one or more user-interfaces (similar to those discussed above in connection with FIGS. 1 and 2) located conveniently on one or more dividers 302 of the workspace. As shown in FIG. 6, an exemplary touchpad or keypad controller 602 may include a series of buttons, dials or the like for controlling color, color temperature, or brightness of one or more lighting units in the workspace. In another aspect, a touchpad or keypad controller 602 also may be configured to select and execute (e.g., upon activation of a button, dial, slider, etc.) one or more lighting programs to generated predetermined lighting conditions from one or more lighting units. Similarly, a remote controller 604 may be configured to communicate user-selectable options wirelessly to one or more lighting units or a collection of networked lighting units.

In another aspect, a touchpad/keypad controller 602 or remote controller 604 may be configured to control a configuration of many lighting units that are particularly grouped together to form one or more lighting zones in the workspace. Zone select button(s) located on the touchpad or remote controller may be configured to allow the occupant to independently control different lighting unit zones by first selecting a zone to control, and then selecting one or more characteristics of the light generated by the lighting units constituting the zone (brightness, color/color temperature, predetermined lighting conditions based on a lighting program, etc.). One example of white-light generation in multiple color-temperature controllable zones, suitable for purposes of an exemplary workspace, is discussed in U.S. application Ser. No. 11/224,683, entitled "Lighting Zone Control Methods and Systems," which is hereby incorporated by reference.

As discussed above in connection with FIG. 2, multiple lighting units deployed in a workspace also may be coupled together to form a lighting network capable of sophisticated controllable lighting functions. In such network configurations, control of lighting units may be under the direction of one or more software programs executed by a central controller or computer (e.g., see the central controller 202 of FIG. 2), in which various parameters of lighting control may be selectable via a graphics user interface (GUI) or "control panel" 606 provided via a computer display or monitor in the workspace. In conjunction with the GUI or control panel 606, the occupant generally may employ a mouse or keyboard in the personal workspace to facilitate selection or input of user-selectable or user-definable parameters for lighting conditions.

In different aspects of computer-based lighting control, one or more programs for controlling lighting conditions and allowing user-selection/definition of lighting parameters may be stored and/or executed on a personal computer in the workspace, and/or one or more other computers beyond the workspace (such as a server for a larger work environment including multiple personal workspaces). In another aspect, user-selected or defined parameters may be stored for later recovery and editing. In this manner, occupants may create and store multiple "workspace lighting profiles" that dictate different lighting conditions based on various occupant preferences. Hence, an occupant may create a "library" of workspace lighting profiles for sophisticated and highly customized control of lighting conditions in the workspace. In yet another aspect, the ability to create and store transportable workspace lighting profiles or libraries of such profiles facilitates workspace mobility and re-configurability.

The GUI or control panel 606 illustrated in FIG. 6 may be provided in a variety of formats to facilitate occupant customization and personalization of lighting in the workspace. In one example, various elements of the control panel 606 may be provided as pull-down menus, in which control parameters for one or more lighting units in the workspace are displayed as items on the menu. For example, a given pull-down menu may have one or more parameters (e.g., brightness, color temperature, color, lighting effect or pattern, text message or video selection for a geometric panel, etc.) which the occupant may adjust or define according to personal preferences. In other embodiments, the control panel may provide one or more pre-configured lighting "themes" as user-selectable options to set lighting conditions in the workspace, which upon selection may automatically control one or more lighting units in the workspace to adjust lighting conditions according to the theme's preset parameters.

As noted above, user-selected or defined parameters for lighting conditions in a workspace may be stored as lighting configuration profiles, thus allowing the occupant to recall personal lighting preferences at a later time, edit personal lighting preferences, or transfer lighting configuration files to another location. The ability to store workspace lighting profiles on any of a variety of media allows for a wide variety of lighting profile recall and execution options in the workspace environment. For example, in one embodiment, a predetermined lighting configuration may be stored in or otherwise encoded on an occupant's identification badge, so that when the badge is detected locally (e.g., the occupant swipes the badge at a main entrance in the overall work environment), the predetermined lighting conditions are automatically implemented in the occupant's workspace. In other embodiments, one or more pre-determined lighting configurations may be associated with a user login, a RFID tag, a retinal scan, finger print scan, or other identification means.

Via a GUI or control panel 606, an occupant also may prescribe lighting conditions that are responsive to one or more sensed environmental conditions. For example, one or more sensors or detectors (e.g., as discussed above in connection with FIG. 1) in the workspace itself or the general environment around the workspace may be coupled to provide input to one or more individual lighting units, or a networked lighting system. In one implementation, lighting units of a networked system may be configured via the control panel 606 to be selectably responsive to various sensed conditions. In particular, lighting conditions may be controlled and varied based on the detection of certain common activities in the workspace, such as typing on a keyboard or talking on the phone.

For purposes of illustration, an exemplary scenario is provided in which one or more sensors (e.g., motion, sound, pressure sensors) may detect that the occupant has resumed typing in front of the computer. As a result, overhead lighting in the workspace may be controlled automatically to dim in order to bring out (i.e., increase the viewing contrast) of the content on the computer display. Simultaneously, task lighting may be controlled to provide brighter lighting on work product near the keyboard, to aid the occupant in reading any documents near the keyboard. Alternatively, if one or more sensors detect that the computer keyboard has remained idle for some time, overhead lighting conditions may be controlled so as to automatically increase overhead illumination in the workspace.

In another example, various lighting conditions may be controlled in response to a voice activation system (via a microphone or other similar sound receiving device disposed in the workspace). Through such an arrangement, the occupant may command lighting units to provide a variety of lighting conditions via voice activated commands.

In yet another example, workspace lighting conditions may be controlled in response to sensed "natural" lighting conditions. Natural lighting conditions may include outdoor light to which the workspace has no access (e.g., in a windowless workspace or a workspace located at some significant distance from windows or doors), but which may be nonetheless measured by a sensor (brightness and/or spectral content) and thereby used as a criterion for lighting control in the workspace. For example, in a windowless or virtually windowless workspace, the workspace lighting may be controlled to essentially emulate outdoor lighting conditions throughout the day (e.g., based on sun movement). In yet another example, some degree of outdoor light may be entering the workspace environment via a window or door, and a local light sensor proximate to the workplace may measure brightness and/or spectral content of the resulting ambient lighting so that workspace lighting conditions may be automatically varied to compensate for changes in natural lighting throughout the day (e.g., so as to maintain essentially constant ambient lighting conditions in the workspace).

In sum, beyond the specific examples provided above for purposes of illustration, workspace lighting conditions may be flexibly controlled in a lighting network implementation pursuant to a variety of user-definable preferences specified via a GUI or control panel 606, including pre-programmed responsiveness based on one or more sensed conditions in and around the workspace, and even beyond the workspace. Lighting conditions in the workspace may be customized to recreate any of a number of natural lighting conditions or completely arbitrary lighting conditions or decorative lighting effects based on virtually limitless different combinations of controllable ambient, task and decorative lighting in the workspace. Lighting networks for a workspace may include any number of addressable and/or controllable lighting units (some examples of which are depicted in FIGS. 3 and 4) which may be integrated into or otherwise associated with the workspace 300.

Figure 7B:
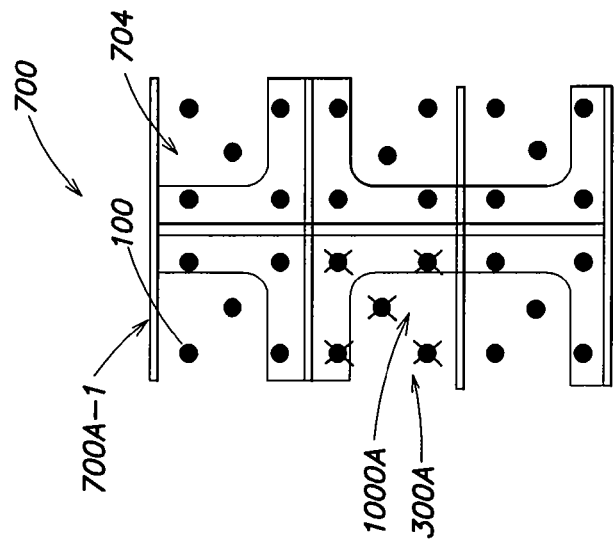
FIGS. 7A, 7B, 7C and 7D illustrate two different floor plans for multiple personal workspaces in a larger working environment, and customized configurations of overhead lighting in connection with workspaces, according to one embodiment of the disclosure.
Figure 7A:
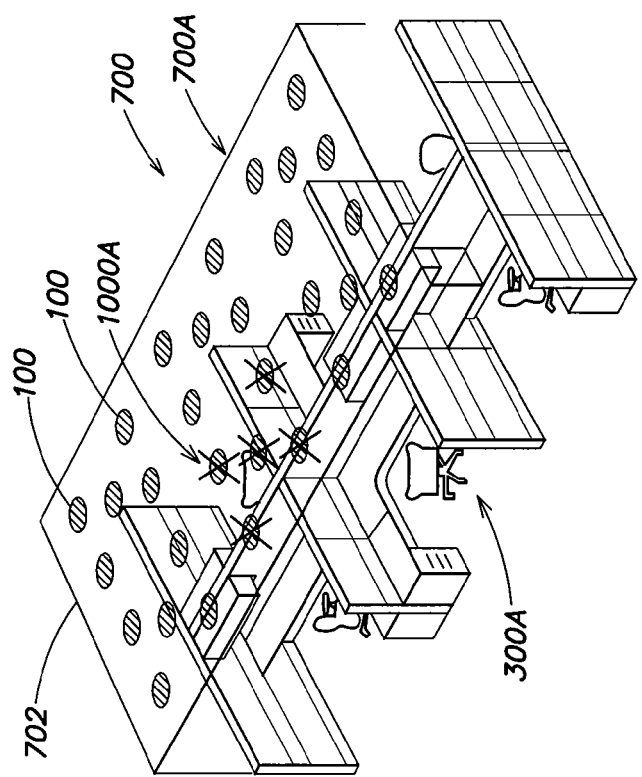
Figure 7D:
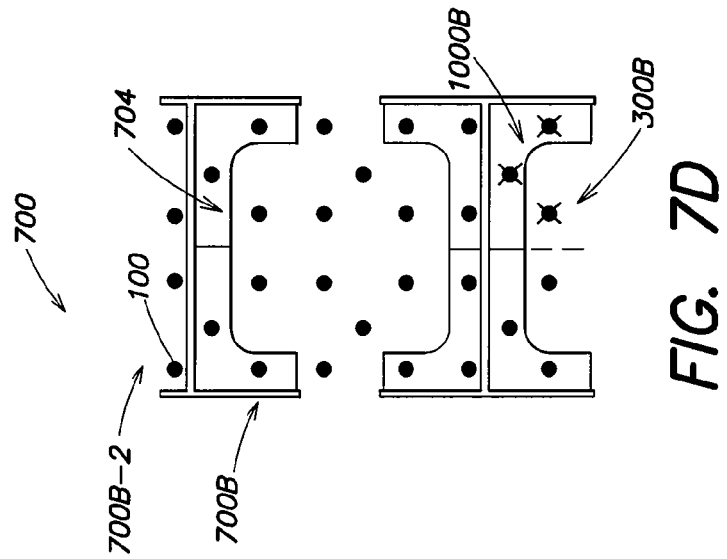
Figure 7C:
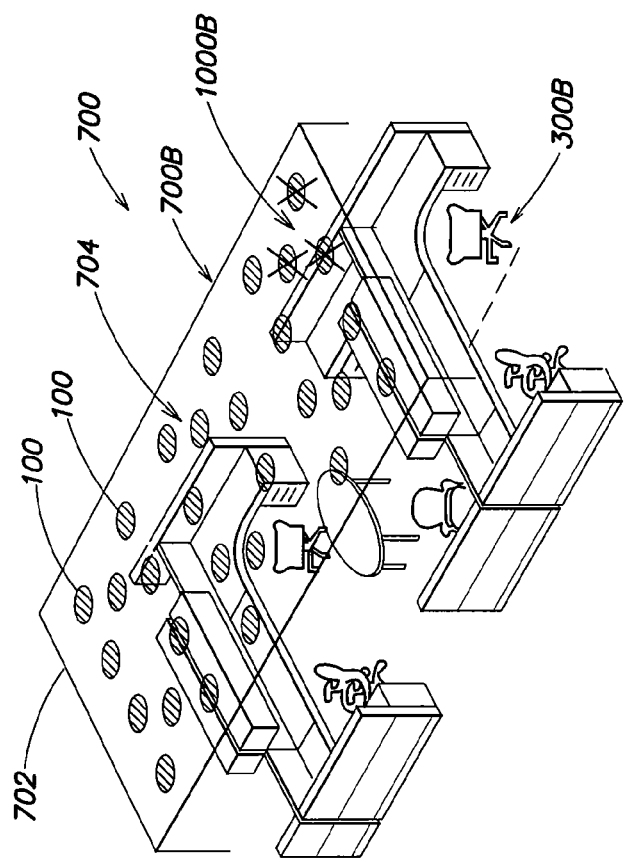

In workspace environments including multiple personal workspaces (e.g., a general office space environment containing multiple cubicles), overhead lighting to provide ambient illumination may be provided as a fixed arrangement of lighting units disposed in a ceiling (e.g., arranged in a grid pattern). Underneath the ceiling in the general workspace environment, multiple personal workspaces may be arranged in a variety of manners. FIGS. 7A and 7B illustrate respective perspective and top views of a first floor plan 700A, and FIGS. 7C and 7D illustrate respective perspective and top views of a second floor plan 700B, for the same office environment 700 having a ceiling 702 in which is disposed a fixed arrangement 704 of lighting units. In the exemplary implementations shown in FIGS. 7A, 7B, 7C and 7D, one or more of the lighting units constituting the fixed arrangement 704 may be similar in various respects to the lighting units 100 discussed above in connection with FIGS. 1 and 2.

More specifically, in FIGS. 7A and 7B, beneath the ceiling 702 a first possible arrangement of personal workspaces constitutes the first floor plan 700A, and in FIGS. 7C and 7D a second possible arrangement of personal workspaces constitutes the second floor plan 700B. In addition to perspective views of the first and second floor plans 700A and 700B shown in FIGS. 7A and 7C, respective top views 700A-1 and 700B-2 also are provided in FIGS. 7B and 7D for the two different floor plans. Also, particular exemplary personal workspaces 300A and 300B for a given occupant are indicated on each of the perspective and top down views.

As also indicated on FIGS. 7A, 7B, 7C and 7D, each of the personal workspaces 300A and 300B is associated with a corresponding group of overhead lighting units constituting a portion of the fixed arrangement 704 in the ceiling 702. In particular, five lighting units constituting a first group of lighting units 1000A, indicated with Xs in the two views of FIGS. 7A and 7B, generally provide overhead lighting to the workspace 300A, while three lighting units constituting a second group of lighting units 1000B, also indicated with Xs in the two views of FIGS. 7C and 7D, generally provide overhead lighting to the workspace 300B.

According to one embodiment of the present disclosure, the fixed arrangement 704 of lighting units disposed in the ceiling 702 may be flexibly subdivided into arbitrary groups of one or more controllable lighting units to facilitate customized overhead lighting in one or more areas below the ceiling 702. For example, in one embodiment, based on the addressability of the lighting units 100 of the fixed arrangement 704 (as discussed above in connection with FIGS. 1 and 2), the first group of lighting units 1000A may be specifically assigned to the workspace 300A such that these lighting units may be controlled by an occupant of that workspace, and the second group of lighting units 1000B may be specifically assigned to the workspace 300B such that these lighting units may be controlled by an occupant of that workspace. Again, based on the addressability of the lighting units 100 disposed in the ceiling 702, virtually any arbitrary assignment of one or more lighting units of the fixed arrangement 704 to a corresponding area or workspace below the ceiling 702 is possible.

The foregoing concept affords significant flexibility in a general workspace environment by facilitating re-configurability and mobility of personal workspaces to accommodate any of a variety of floor plans. For example, consider that, for some period of time, the first floor plan 700A is adopted in a workspace environment, and an occupant of the workspace 300A has the ability to control the first group of lighting units 1000A so as to customize the overhead ambient lighting in the workspace 300A. In particular, in one implementation as discussed above, the occupant may have selected values or options for any number of parameters corresponding to characteristics of the overhead ambient lighting (e.g., via a control panel/graphic user interface discussed above in connection with FIG. 6) which may be recalled on demand, or in response to predetermined events or conditions, to recreate desired overhead ambient lighting in the workspace 300A. Implicit in this ability to control the overhead ambient lighting in the workspace 300A is the assignment of the first group of lighting units 1000A to the workspace 300A (e.g., via particular addresses associated with these lighting units).

At some later time, the second floor plan 700B is adopted in the workspace environment, and the occupant of the former workspace 300A is now given the workspace 300B in the second floor plan. Based on the new arrangement of workspaces, the second group of lighting units 1000B now provides the overhead ambient lighting in the workspace 300B. Accordingly, to afford the occupant a similar ability to control and customize the overhead ambient lighting in the workspace 300B, the three lighting units of the second group 1000B are assigned to the workspace 300B, again based on the particular addresses associated with the lighting units in this group. In this manner, any stored settings (e.g., in a workspace lighting configuration file) that the occupant had relating to overhead ambient lighting preferences in the former workspace 300A may be easily applied in the new workspace 300B.

In various aspects of this embodiment, the assignment of addresses for one or more lighting units in the fixed arrangement 704 to one or more workspaces below the ceiling may be performed a priori, for example, by an information technology specialist or network administrator in the workspace environment, such that the address assignment of particular overhead lighting units to a given workspace is essentially transparent to the occupant of the given workspace. For example, the responsiveness of one or more assigned lighting units to either manual or automatic (e.g., computer or GUI-based) control in the workspace may be predetermined such that the occupant merely utilizes the available control mechanism(s) (e.g., selects a pull-down menu on a control panel/GUI for "overhead lighting," and then selects various desired options, or recalls previously programmed preferences from the prior workspace), and the desired lighting condition(s) are recreated by the assigned lighting units. Alternatively, an occupant may be given one or more identifiers or addresses for overhead lighting units corresponding to the given workspace to appropriately enter into one or more available control mechanisms (e.g., a control panel/GUI query for "overhead lighting addresses") to effect the assignment of overhead lighting units to the workspace. Again, this functionality permits an added degree of mobility and re-configurability in a work/office environment by allowing the control of lighting units of a fixed overhead lighting arrangement to be flexibly assigned to different areas or workspaces below the ceiling.

Figure 8:
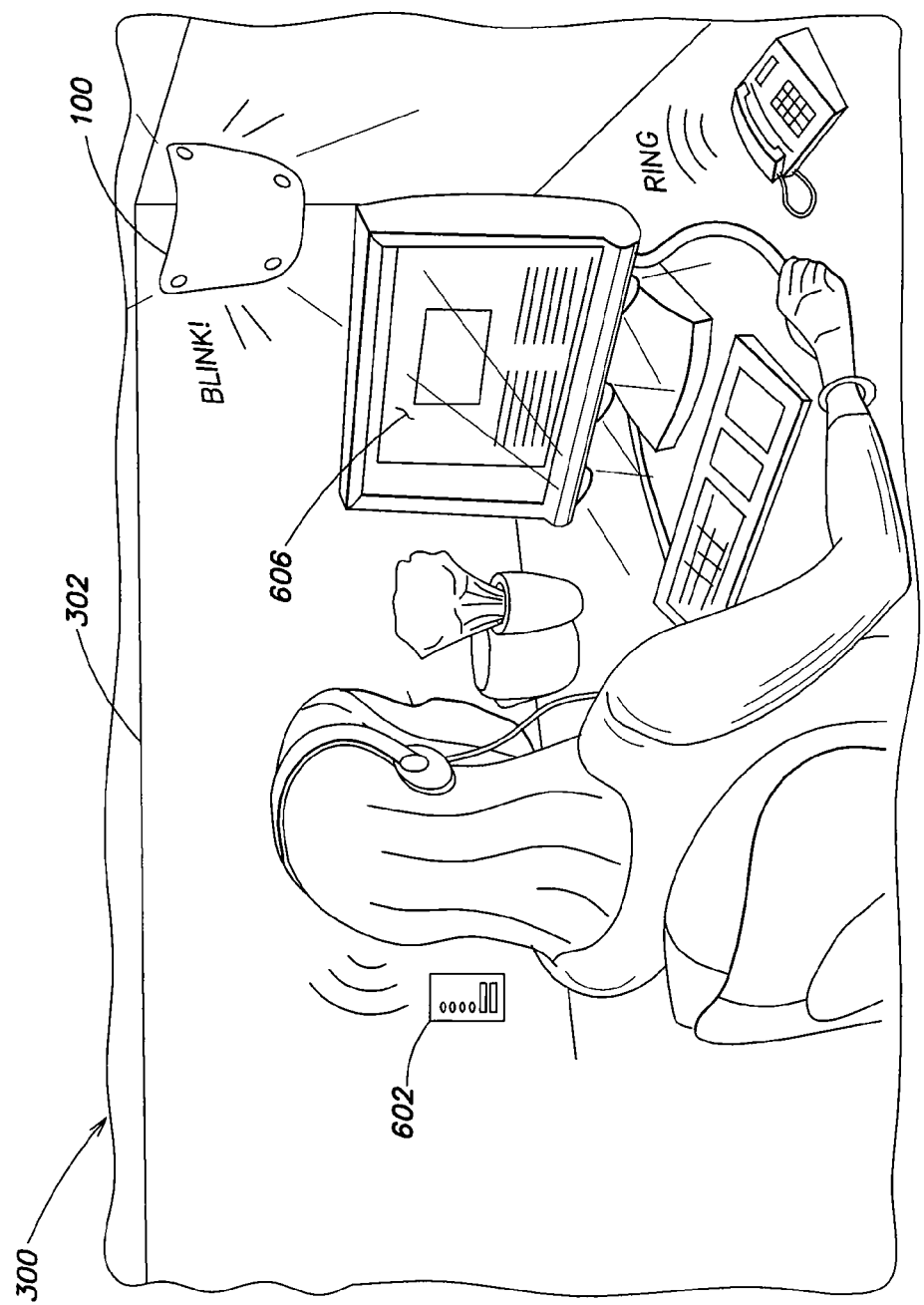
FIG. 8 illustrates an example of information being provided by lighting in a workspace, according to one embodiment of the disclosure.

FIG. 8 is another view similar to that shown in FIG. 6 illustrating an occupant in the workspace 300, in which one or more aspects of lighting in the workspace are used to convey information, according to various embodiments of the present disclosure. As discussed briefly above, one or more characteristics of light (e.g., a color of light, a brightness of light, a temporal pattern of light, or static or dynamic multicolor lighting effect, text, graphics, video, etc.) generated by any of the lighting units associated with a workspace may provide information that is relevant to the occupant of the workspace. To provide a relatively straightforward but nonetheless illustrative example of this, FIG. 8 depicts an occupant working at a computer terminal and wearing headphones, such that the occupant generally cannot hear sounds in the workspace environment. Accordingly, when a telephone in the workspace rings, one or more lighting units 100 in the workspace may be configured and controlled to blink so as to indicate an incoming phone call to the occupant.

More generally, one or more lighting units in the workspace may be configured and controlled (e.g., via a GUI providing user-selectable options) to generate light having one or more predetermined characteristics representing one or more particular events or conditions, so as to provide information to the occupant. Virtually a limitless number of events or conditions may be specified to correspond to one or more characteristics of generated light. Some examples of events or conditions that may be represented via lighting characteristics include, but are not limited to, status of various events in the workspace (incoming phone calls and/or email, presence or absence of occupant), information obtained from the Internet (e.g., weather conditions, news events, changes in stock prices, etc.), calendar events having a particular date or time (meeting reminders, status of various events of interest to the workspace occupant), information based on one or more sensed conditions, or other information related to virtually any aspect of a workspace environment. In one exemplary implementation, control of one or more lighting units may be linked to an office-oriented software program, such as Microsoft® Outlook®, that provides events or conditions (calendar events, email, tasks, etc.,) for which status information may be provided via lighting in the workspace.

Again, information may be represented by lighting in a wide variety of relatively straightforward or complex manners including, but not limited to, color of light, brightness of light, temporal patterns of light, static or dynamic multicolor lighting effects, text messages, graphics or video (e.g., via one or more geometric panel lighting units), or combinations of the foregoing. For example, as a reminder for an important meeting, multiple lighting units in the workspace may be configured and controlled to generate a coordinated lighting effect representing a swirling rainbow pattern of colors in the workspace. Relative outdoor temperature may be indicated, for example, by a color of light generated by one or more lighting units in the workspace (e.g., blue=cold; red=hot). Further details on informational aspects of lighting are discussed in U.S. Patent Publication No. US-2002-0152045-A1, published Oct. 28, 2004, entitled "Information Systems," hereby incorporated herein by reference.

In one aspect, the correspondence of event or condition to lighting characteristics may in some cases be predetermined for a general workspace environment by an information technology specialist or network administrator to ensure consistency in some information-rendering situations for an entire workplace. For example, with reference again to FIG. 8, a general office environment may be configured such that a dedicated lighting unit in each workspace of the office (or some grouping of multiple workspaces in the office) blinks or displays a predetermined color when an incoming telephone call is present. In another aspect, the correspondence between event or condition and lighting characteristics may be significantly or entirely under the control of the occupant of the workspace, and based on a wide variety of possible events or environmental conditions and corresponding lighting characteristics, as discussed above.

Figure 9:
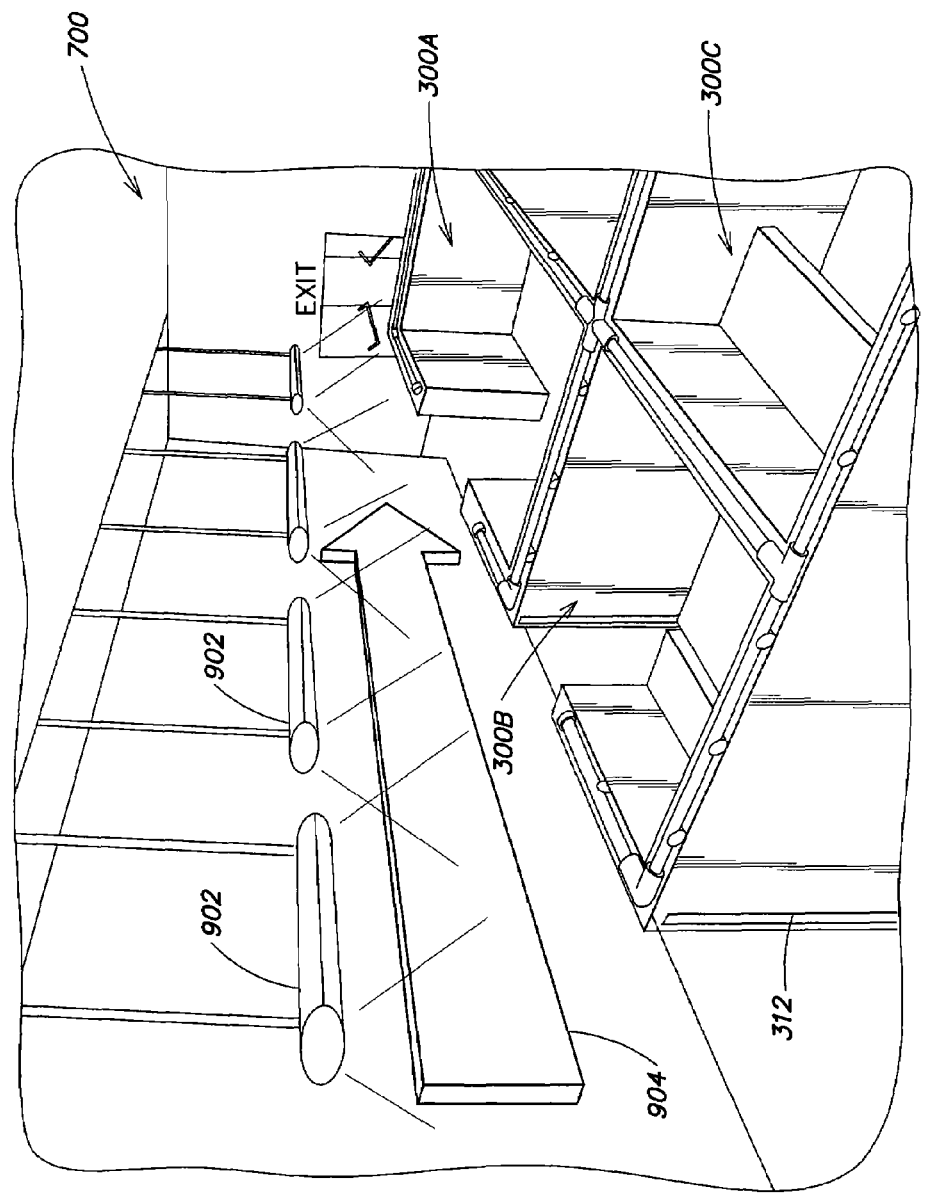
FIG. 9 illustrates various aspects of informational lighting in a general workspace environment, according to one embodiment of the disclosure.

In other embodiments of the present disclosure, the concept of providing information via light may be applied to lighting that goes beyond any particular workspace and that is present in a larger workspace environment. To illustrate this concept, FIG. 9 depicts another view of a general office environment 700, including multiple workspaces 300A, 300B and 300C. The office environment 700 of FIG. 9 may include one or more overhead lighting units 902 that are not necessarily dedicated to any particular workspace but provide overhead lighting to common areas such as walkways in the office environment. FIG. 9 also illustrates "accent" lighting units 312 (discussed above in connection with FIG. 3) that may be disposed along one or more ledges of workspace dividers or partitions (or in connection with other structural or architectural features of various workspaces), as well as a panel lighting unit 904 (e.g., similar to the geometric panel lighting unit 316 discussed above in connection with FIG. 3) disposed along or otherwise integrated with a wall of a common space/walkway in the office environment.

In the scenario depicted in FIG. 9, various aspects of information provided by lighting in the general office environment 700 may relate to indication of one or more particular occupants, or groups of occupants in the office environment arranged by "department" or functional organization (e.g., finance/accounting, human resources, legal, information technology, document services, mail room, etc.). In one aspect of this embodiment, some characteristic of light, such as color, may be used to indicate a particular occupant or groups of occupants, as well as directions/orientation to the location of the one or more occupants or group of occupants. As such, one or more occupants or a group of occupants may be easily identified through an associated characteristic of light, such as color (e.g., a person looking for the "finance department" merely needs to know the associated color of the finance department, and then proceed towards workspaces or workspace areas indicated with the associated color of light). For purposes of the present discussion, the identification of one or more occupants or groups of occupants (e.g., a department or other functional group in a workspace environment) via a characteristic of lighting is referred to as "wayfinding."

Lighting for wayfinding purposes may be provided by various elements of lighting in individual workspaces and/or an overall workspace environment in general. For example, in the office environment of FIG. 9, "coded light" for wayfinding purposes may be provided by one or more accent lighting units 312 associated with one or more personal workspaces, as well as one or more overhead lighting units 902 in the common area/hallway, and/or the panel lighting unit 904 disposed along a wall of the office environment. Lighting for wayfinding purposes also may be provided by other lighting units not particularly shown in FIG. 9 (e.g., other exemplary lighting units of the personal workspaces shown in FIG. 3 or 4, lighting units disposed in the ceiling 702 shown in FIGS. 7A and 7B, etc.).

In one aspect of this embodiment, lighting units configured for wayfinding purposes may be controlled to provide walking directions in a work facility or office installation. For example, a customer visiting a particular employee/occupant or department of the office environment depicted in FIG. 9 may be instructed by a receptionist simply to "follow the green lights" to the particular employee/workspace occupant or department. The receptionist then may activate (e.g., via a GUI at their desk) a wayfinding program to the particular employee/department which, based on the addressability of various lighting units in the office environment, identifies and controls particular lighting units in the office environment along an appropriate path to the employee/department so as to generate green light. Beyond the foregoing specific example, it should be appreciated that one or more characteristics of light associated with a particular wayfinding task may include different colors as well as static or dynamic patterns of one or more colors. For example, the green light discussed above may be strobed in a sequential fashion along the path to the desired employee/ department to encourage a particular direction of travel along the indicated path.

In another embodiment, lighting in a general workspace environment such as the office environment shown in FIG. 9 may be controlled for various safety purposes. For example, addressable lighting units associated with one or more particular workspaces and/or the general office environment may be controlled in connection with other building-level systems, such as fire alarms, to provide lighting (similar to that provided for wayfinding purposes) to indicate escape routes and emergency exits for a variety of emergency situations.

In yet another embodiment, controlled lighting concepts may be employed together with radio frequency identification tagging concepts (RFID tags) in a workspace environment to provide information or indication relating to the location of desired objects. For example, a filing cabinet or file area in a workspace may include files that are each encoded with a unique PFID tag, and the location of each file accordingly may be identified using known RFID techniques. To facilitate an indication of an identified files' location, one or more lighting units may be coupled to or otherwise integrated with filing cabinets, or appropriately located and distributed throughout a file area. By controlling the lighting units based on information obtained from an RFID detection system, the location of a requested file determined using RFID techniques may then be indicated by some characteristic of lighting associated with the filing cabinets or file area to indicate the presence of a requested/ identified file.

As discussed above, in addition to workspace lighting and customization, other embodiments of the present disclosure are directed to aspects of a workspace environment beyond lighting that may be configured to facilitate workspace customization or personalization. For example, some embodiments related to workspace customization generally involve power distribution schemes that facilitate a convenient and flexible arrangement of power-consuming components and appliances (i.e., more generally, "electronic devices") that may be commonly found in a workspace.

In a conventional workspace environment, power for electronic devices generally is provided by typical AC power outlets having fixed locations on walls or other surfaces, as well as AC power strips that may be plugged into wall outlets and allow for multiple power-consuming components to draw power from a given AC outlet. Many common workspace electronic devices that require power are easily envisioned including, but not limited to, various lighting devices as discussed above (e.g., desktop lamps, floor lamps), as well as various computer-related components (laptop computers, main frame computers, computer displays, printers, scanners, external memory storage equipment), telephones, fax machines, typewriters, electric staplers or pencil sharpeners, various audio/visual equipment, time keeping elements (clocks, clock-radios), and the like. Also commonly found in workspaces are electrical devices that may require a power transformer or power "adaptor" to transform conventional AC wall voltages to lower DC voltages; examples of such devices include, but are not limited to, chargers for cell phones, personal audio/visual devices (CD players, MP3 players, etc.), gaming devices, personal digital assistants (PDAs), BlackBerry™ devices, etc. In fact, many common electrical devices found in a workspace environment, even if drawing power directly from an AC wall outlet, at some point convert the AC wall voltage to a lower DC voltage more suitable for operation of the electronic device.

In view of the foregoing, other embodiments of the present disclosure are directed to power distribution techniques that provide power conveniently and flexibly in a workspace environment. In some aspects of these embodiments, low DC voltages suitable for powering a host of common electronic devices is safely provided in a distributed manner in a workspace to facilitate convenient placement and arrangement of electronic devices, including various types of lighting units as discussed above.

Figure 10:
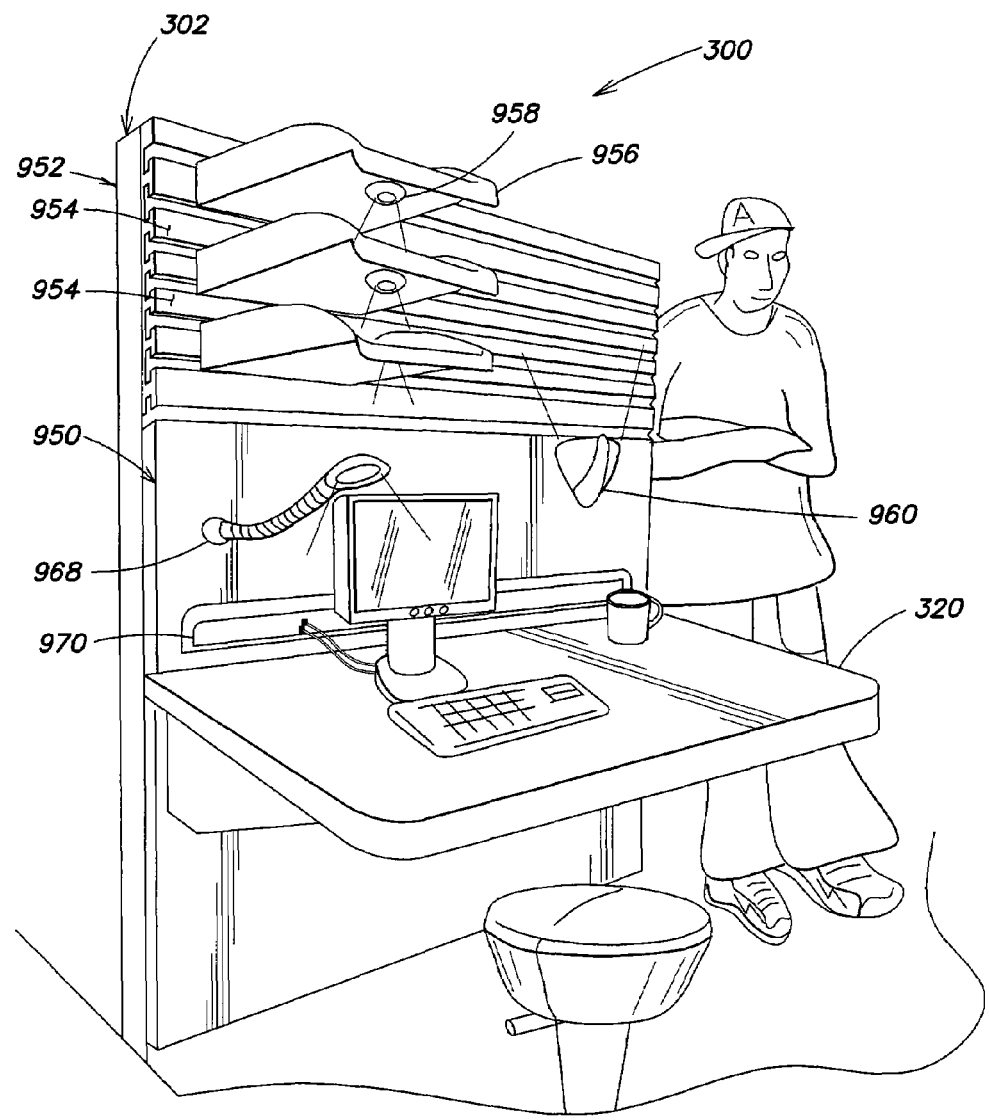
FIG. 10 illustrates different power distribution techniques for a personal workspace, according to one embodiment of the disclosure.

More specifically, with reference to FIG. 10, in one embodiment at least a portion of a wall, divider or partition 302 in a workspace 300 may be configured as a "powered pin-board" 950, in which virtually an entire surface of the powered pin-board provides access to a DC voltage appropriate for powering electronic devices. In FIG. 10, two different styles of lighting units 960 and 968 are illustrated as coupled to the powered pin-board 950 in arbitrary locations. In yet another embodiment, at least portion of a wall, divider or partition in a workspace may be configured as a "powered slatwall" 952 in which multiple tracks or "slats" 954 running along the slatwall (e.g., in a horizontal fashion) provide both mechanical support for shelving or trays 956, as well as a distributed DC voltage along the track or slat to provide power to electronic devices that may be coupled to the slats. In various aspects discussed further below, electronic devices receiving power from a given slat 954 of the powered slatwall 952 may include "free standing" lighting units or electronic devices, as well as lighting units 958 attached to or otherwise integrated with one or more trays or shelves 956 that are in turn coupled to a slat of the slatwall.

Although both a powered pin-board 950 and a powered slatwall 952 are depicted in FIG. 10 on different portions of a divider or partition 302, it should be appreciated that the present disclosure is not limited to the particular arrangement shown in FIG. 10. For example, a given divider or partition may include both a powered pin-board 950 and a powered slatwall 952 arranged above and below each other in any order, or alternatively alongside each other; likewise, a divider/partition may include only one or the other of a powered pin-board 950 and a powered slatwall 952. Furthermore, in addition to the pin-board and slatwall, FIG. 10 illustrates that a divider or partition 302 also may be equipped with one or more conveniently located power strips 970, that include conventional AC outlets or, alternatively, custom DC outlets providing specific sources of an appropriate DC voltage suitable for operation of various electronic devices (e.g., the computer display illustrated in FIG. 10 may be configured without a power transformer, such that it may receive power directly from a conveniently located DC voltage source connection of the power strip 970 rather than a conventional AC outlet).

Figure 11:
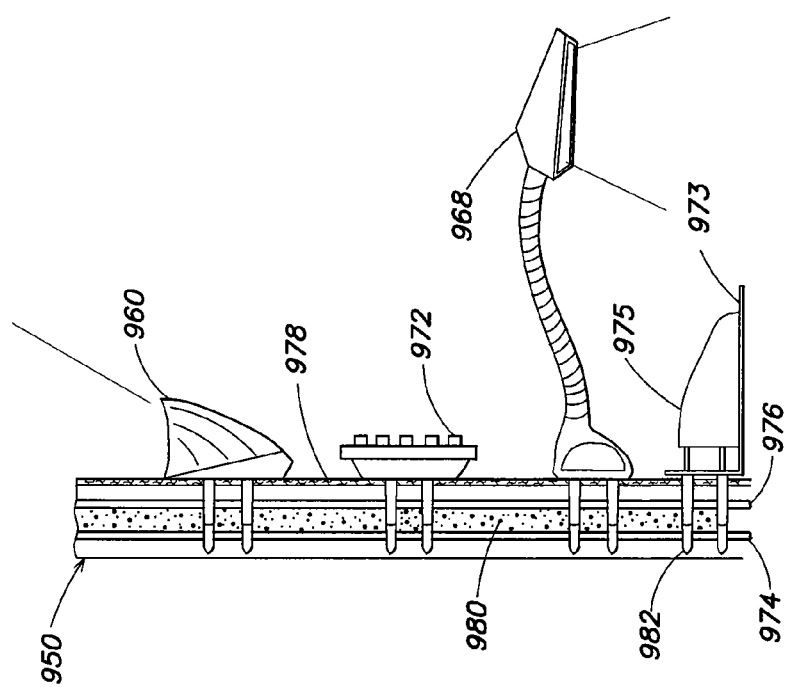
FIG. 11 illustrates various details of a powered pin-board for a personal workspace, according to one embodiment of the disclosure.

FIG. 11 shows a side view of the powered pin-board 950 illustrated in FIG. 10, according to one embodiment of the disclosure. As depicted in FIG. 11, in one exemplary implementation the pin-board 950 may include a positive conductor plane 974 (to be coupled to a positive potential of a DC voltage) and a negative conductor plane 976 (to be coupled to a negative potential of a DC voltage) separated by an insulating layer (e.g., non conductive foam) 980. In one aspect of this implementation, the pin-board also may include a "self-healing" fabric face 978. Electronic devices to be coupled to the pin-board may include pins 982 that are appropriately configured to respectively make electrical connection with only one of the positive and negative conductor planes, while providing mechanical support by piercing through the fabric face, the conductor planes, and the insulating layer.

In FIG. 11, three exemplary electronic devices are illustrated, including an up-lighting unit 960, a task lighting unit 968, and a control keypad 972 (e.g., which in some implementations may be similar in function and/or construction to one or more user-interfaces for lighting control discussed above), each including a pin configuration suitable for electrical and mechanical engagement with the powered pin-board 950. For example, in one embodiment, when the pins 982 of a given device are inserted into the pin-board, insulating portions of the pins may isolate the pin from one of the conductor planes while exposing the pin to the other of the conductor planes. By appropriately fashioning the various layers of the pin-board and the partially insulated pins, electronic devices may be readily inserted into the pin-board at any desired location and be immediately coupled to a source of DC power. Examples of pin constructions and pin-board materials suitable for use in a powered pin-board 950 for a workspace may be found at http://www.lightandmotion.at/eng-dipline.html and are available from Light & Motion Lichttechnik GmbH, Vienna, Austria.

In another aspect of the powered pin-board 950 shown in FIGS. 10 and 11, one or both of the conductor planes may be magnetized, and one or more electronic devices to be coupled to the pin-board also may be magnetized in a complementary fashion to facilitate mechanical support of the electronic device to the pin-board. In yet another aspect, as shown in FIG. 11, a small tray 973 for a relatively smaller electronic device 975, such as a cell phone, PDA, BlackBerry™ or the like, may be configured with pins 982 and an appropriately fashioned connector to couple the DC voltage from the pin-board 950 to the electronic device 975, thus providing a convenient mechanism for powering or charging such devices.

Figure 12:
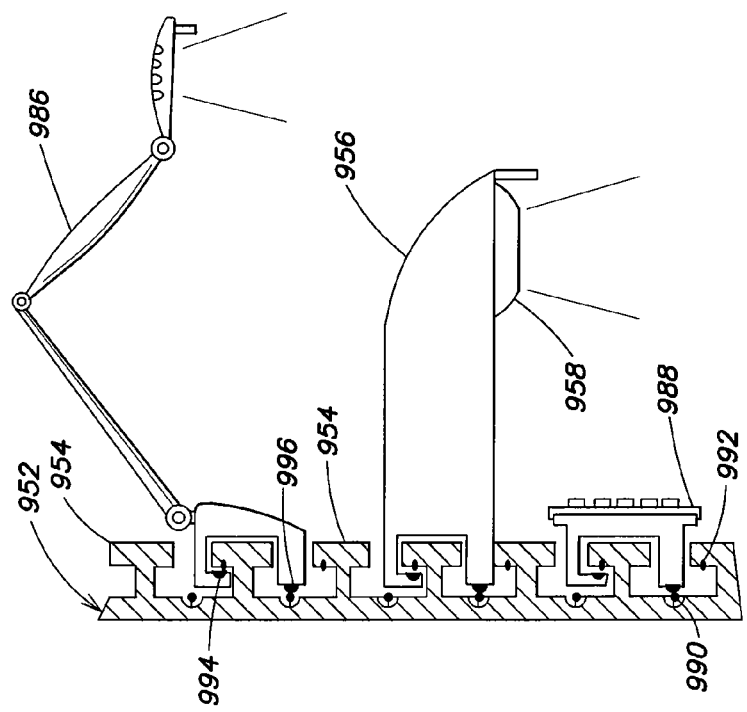
FIG. 12 illustrates various details of a powered slatwall for a personal workspace, according to one embodiment of the disclosure.

FIG. 12 shows a side view of the powered slatwall 952 illustrated in FIG. 10, according to one embodiment of the disclosure. As depicted in FIG. 12, in one exemplary implementation the slatwall 952 may include on or more slats 954 each configured with one or more positive-potential voltage connection points 992 and one or more negative-potential voltage connection points 990. In one aspect, the positive and negative connection points may run along a horizontal length of the slat. In another aspect of this embodiment, each slat has an essentially "T" shape to facilitate engagement with an electro-mechanical interface of an object or device to be coupled to the slat. In another aspect, the shape of a slat may safely preclude inadvertent human contact with the voltage connection points. The electro-mechanical interfaces for devices or objects to be coupled to a given slat include one or more complementary positive-potential voltage connection points 994 and one or more complementary negative-potential voltage connection points 996 that respectively mate with the positive connection points 992 and negative connection points 990 of the given slat.

In FIG. 12, as in FIG. 11, three exemplary electronic devices are illustrated, including a task lighting unit 986, a control keypad 988 (e.g., which may be similar in function to the control keypad 972 shown in FIG. 11), and a lighted tray 956 including a lighting unit 958, wherein each device includes an electro-mechanical interface suitable for electrical and mechanical engagement with the slats 954. In one slatwall implementation, multiple lighted trays may be disposed in a variety of arrangements on the slatwall 952 (e.g., see FIG. 10), such that the lighting unit 958 of a first tray provides lighting for objects in a second tray disposed beneath the first tray. In another aspect, while not shown explicitly in FIG. 12, a small tray similar to the tray 973 illustrated in FIG. 11 may be configured with a suitable electro-mechanical interface to engage with a slat, as well as an appropriately fashioned device connector, so as to provide power for operating or charging an electronic device on the tray.

Figure 13:
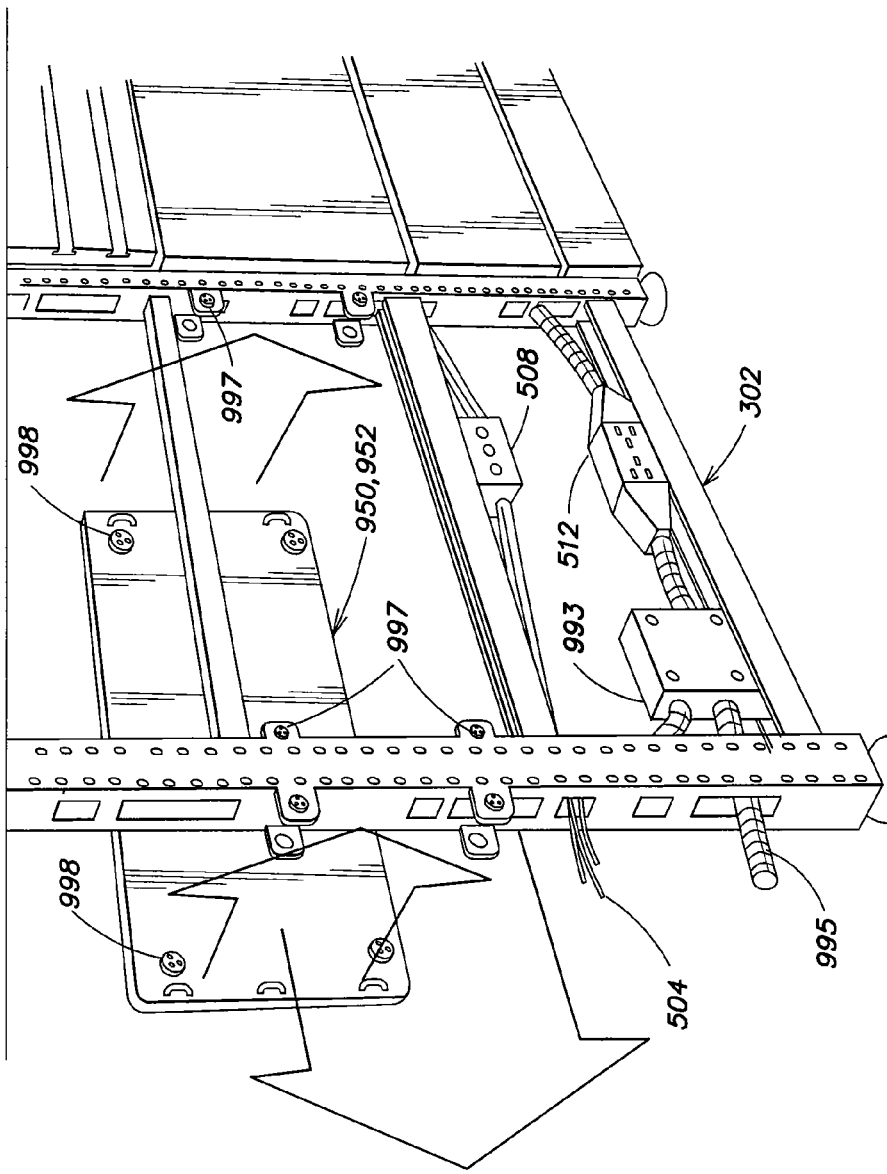
FIG. 13 illustrates an exemplary technique for providing a DC voltage to either the powered pin-board of FIG. 11 or the powered slatwall of FIG. 12, according to one embodiment of the disclosure.

FIG. 13 illustrates one technique for providing a DC voltage to either a powered pin-board or powered slatwall in connection with one or more dividers or partitions of a workspace, according to another embodiment of the disclosure. In particular, FIG. 13 shows an exposed interior portion of a divider 302, similar to that shown in FIG. 5, in which AC power via an AC line voltage 995 is provided to one or more power transformers 993 mounted within a junction box located in the interior framework of the divider. The AC line voltage may be provided in turn from the junction box to one or more AC outlets 512 disposed on the divider. An appropriate DC voltage output by the power transformer 993 (e.g., 24 VDC, 12 VDC, 5 VDC) is routed from the junction box via wiring to one or more connection points 997 formed in the frame of the divider, thereby providing at least one positive-potential and one negative-potential electrical connection point to the DC voltage.

In FIG. 13, a rear side of the pin-board 950 or slatwall 952 is equipped with one or more complementary or mating electrical connection points 998, which engage with the connection points 997 when the pin-board or slatwall is secured to the divider, thereby providing the DC voltage to the pin-board or slatwall. For example, in one implementation, mating friction pins may be employed for the connection points 997 and 998 to allow the DC voltage connection to be made when the pin-board or slatwall is clipped to the framework of the divider.

FIG. 13 also shows that the divider may include additional wiring or cabling for data 504, which may be made available to the workspace via data connections 508 (as also shown in FIG. 5). Such data connections may be employed for controlling one or more lighting units or other electronic devices in the workspace, such as the lighting units or controllers shown coupled to the pin-board or slat-board depicted in FIGS. 11 and 12. While these exemplary electronic devices receive power from the pin-board or slatwall, in one embodiment control or data signals to and from one or more electronic devices may be communicated via data connections 508 or wirelessly, as discussed above in connection with FIGS. 1 and 2, for example. In another embodiment, the positive and negative conductors of a pin-board or a slatwall may be configured to distribute both an appropriate DC voltage for providing power to electronic devices, as well as data to or from electronic devices, using a power/data protocol, some examples of which are discussed, in U.S. Pat. No. 6,292,901, entitled "Power/Data Protocol," hereby incorporated herein by reference.

By employing a power/data protocol and or wireless data communications together with one or both of powered pin-boards and powered slatwalls, a wide range of flexibility is provided in the workspace for arranging controllable electronic devices, including controllable lighting units. For example, controllable/addressable lighting units may be readily place virtually anywhere on a powered pin-board or slatwall and receive data. Similarly, electronic sensors or other electronic devices configured for coupling to a powered pin-board or slatwall may be integrated with a networked lighting system by transmitting or receiving data via a power/data protocol or wireless communications. More generally, one or more communication channels provided by a power/data protocol or wireless protocol used in conjunction with a powered pin-board or slatwall configuration may provide a generic network connection to any system of networked components. In this manner, a wide variety of computing devices and other electronic devices may be arbitrarily arranged and nonetheless connected to a network via the pin-board or slatwall to facilitate data exchange, file uploading and downloading, etc.

Having thus described several illustrative embodiments, it is to be appreciated that various alterations, modifications, and improvements will readily occur to those skilled in the art. Such alterations, modifications, and improvements are intended to be part of this disclosure, and are intended to be within the spirit and scope of this disclosure. While some examples presented herein involve specific combinations of functions or structural elements, it should be understood that those functions and elements may be combined in other ways according to the present disclosure to accomplish the same or different objectives. In particular, acts, elements, and features discussed in connection with one embodiment are not intended to be excluded from similar or other roles in other embodiments. Accordingly, the foregoing description and attached drawings are by way of example only, and are not intended to be limiting.

The invention claimed is:

1. A workspace, comprising:
   at least one work surface;
   at least one divider to provide at least one boundary for the workspace, the at least one divider including a frame and at least one finished surface exposed to the workspace;
   a plurality of LED-based lighting units to generate visible light in the workspace;
   at least one controller to control at least some of the plurality of LED-based lighting units, the at least one controller being disposed in an interior portion of the frame of the at least one divider;
   at least one power supply disposed in the interior portion of the frame of the at least one divider, the at least one power supply receiving as an input an AC line voltage and providing as an output a DC voltage, wherein the DC voltage provides operating power for at least some of the plurality of LED-based lighting units; and
   at least one user-interface, coupled to the at least one controller, to facilitate control of at least one characteristic of at least some of the visible light generated in the workspace by at least some of the plurality of LED-based lighting units.

2. The workspace of claim 1, wherein the visible light includes at least one of illumination in at least a portion of the workspace and task lighting directed to at least a portion of the at least one work surface, and wherein the plurality of LED-based lighting units include:
   at least one first lighting unit to provide at least some of the illumination; and
   at least one second lighting unit to provide at least some of the task lighting, wherein the at least one user-interface is configured to facilitate control of at least one of a color and a color temperature of at least one of the illumination and the task lighting.

3. The workspace of claim 2, wherein:
   the plurality of LED-based lighting units further includes at least one geometric panel lighting unit disposed in the workspace;
   at least some of the visible light generated by the at least one geometric panel lighting unit constitutes at least one of a static lighting pattern, a dynamic lighting pattern, a graphic display, a text message, and a video; and
   the at least one user-interface is further configured to facilitate selection of the at least one of the static lighting pattern, the dynamic lighting pattern, the graphic display, the text message, and the video.

4. The workspace of claim 3, wherein the at least one geometric panel lighting unit is integrated to form a portion of the at least one divider.

5. The workspace of claim 2, wherein the plurality of LED-based lighting units further includes at least one privacy-related lighting unit that is configured to be at least partially transparent when at least some of the visible light is not generated and substantially opaque when at least some of the visible light is generated.

6. The workspace of claim 5, wherein the at least one privacy-related lighting unit is integrated to form a portion of the at least one divider.

7. The workspace of claim 5, wherein the at least one privacy-related lighting unit includes:
   an at least partially transparent substrate; and
   at least one LED-based light source configured to direct the at least some of the visible light to the at least partially transparent substrate.

8. The workspace of claim 7, wherein the at least one partially transparent substrate includes a rigid panel, and wherein the at least one LED-based light source is configured to generate the at least some of the visible light from within the rigid panel.

9. The workspace of claim 8, wherein the rigid panel is integrated to form a portion of the at least one divider.

10. The workspace of claim 8, wherein the rigid panel includes a plurality of perturbations within the panel or on a surface of the panel that are configured to serve as scattering centers for the at least some of the visible light.

11. The workspace of claim 7, wherein the at least one partially transparent substrate includes at least one of a flexible translucent mesh screen and a halftone screen.

12. The workspace of claim 2, wherein:
   the at least one first lighting unit includes at least one first addressable lighting unit having at least one first address and the at least one second lighting unit includes at least one second addressable lighting unit having at least one second address different than the first address; and
   the at least one controller is configured to control at least one of a first color and a first color temperature of the illumination based on the at least one first address, and at least one of a second color and a second color temperature of the task lighting based on the at least one second address.

13. The workspace of claim 12, wherein: the at least one user-interface includes at least one graphics user interface (GUI) associated with a computer display disposed in the workspace, the GUI being configured to allow an occupant of the workspace to select at least one user-definable parameter associated with at least one of the illumination and the task lighting; and the at least one controller is configured to control at least one characteristic of at least one of the illumination and the task lighting based at least in part on the at least one user-definable parameter.

14. The workspace of claim 13, wherein the at least one GUI is configured to allow the occupant to specify at least one of the first color, the first color temperature, the second color and the second color temperature via the at least one user-definable parameter.

15. The workspace of claim 13, wherein the at least one GUI is configured to allow the occupant to specify at least one lighting effect involving at least one of the illumination and the task lighting via the at least one user-definable parameter.

16. The workspace of claim 13, wherein the at least one GUI is configured to allow the occupant to specify a correspondence between at least one condition and the at least one of the illumination and the task lighting via the at least one user-definable parameter.

17. A method of providing lighting in a workspace including at least one work surface, the method comprising acts of:
   A) generating visible light in the workspace via at least one LED-based lighting unit; and
   B) controlling at least one of a color and a color temperature of at least some of the visible light generated in the workspace via at least one user-interface,
   wherein the act A) comprises acts of:
      A1) generating first visible light in the workspace via at least one first LED-based lighting unit; and
      A2) generating second visible light in the workspace via at least one second LED-based lighting unit, and
   wherein the act B) comprises an act of controlling at least one of a first color and a first color temperature of the first visible light and at least one of a second color and a second color temperature of the second visible light via the at least one user-interface,
   and wherein the first visible light includes illumination in at least a portion of the workspace and the second visible light includes task lighting directed to at least a portion of the at least one work surface.

18. The method of claim 17, wherein both the first visible light and the second visible light include colored light, and wherein the act B) comprises an act of independently controlling the first color of the first visible light and the second color of the second visible light via the at least one user-interface.

19. The method of claim 17, wherein the first visible light includes essentially white light, and wherein the act B) comprises an act of controlling the first color temperature of the first visible light via the at least one user-interface.

20. The method of claim 19, wherein the second visible light includes essentially white light, and wherein the act B) comprises an act of controlling the second color temperature of the second visible light via the at least one user-interface.

21. The method of claim 20, wherein the act B) comprises an act of identically controlling the first color temperature and the second color temperature.

22. The method of claim 20, wherein the act B) comprises an act of independently controlling the first color temperature and the second color temperature.

23. The method of claim 20, wherein the act B) comprises an act of controlling the first color temperature and the second color temperature such that the first color temperature and the second color temperature are different.

24. The method of claim 19, wherein the second visible light includes colored light, and wherein the act B) comprises an act of controlling the second color of the second visible light generated in the workspace via the at least one user-interface.

25. The method of claim 24, wherein the at least one user-interface includes a first user-interface to control the first color temperature of the first visible light, and a second user-interface to control the second color of the second visible light.

26. The method of claim 24, wherein the at least one user-interface includes a single user-interface to control both the first color temperature of the first visible light and the second color of the second visible light.

27. The method of claim 17, wherein the at least one first LED-based lighting unit includes at least one first addressable lighting unit having at least one first address and the at least one second LED-based lighting unit includes at least one second addressable lighting unit having at least one second address different than the first address, and wherein the act B) comprises an act of: B1) controlling the at least one of the first color and the first color temperature of the first visible light based on the at least one first address, and controlling the at least one of the second color and the second color temperature of the second visible light based on the at least one second address.

28. The method of claim 17, wherein the at least one first LED-based lighting unit includes at least one first addressable lighting unit having at least one first address, wherein the at least one first addressable lighting unit is disposed in a ceiling above the workspace as part of a fixed arrangement of lighting units, and wherein the method further comprises acts of: assigning the at least one first address to the workspace; and controlling the at least one of the color and the color temperature of the at least some of the visible light via the at least one user-interface, based at least in part on the at least one first address.

29. A method of providing lighting in a workspace including at least one work surface, the method comprising acts of:
   A) generating visible light in the workspace via at least one LED-based lighting unit; and
   B) controlling at least one of a color and a color temperature of at least some of the visible light generated in the workspace via at least one user-interface,
   wherein the act A) comprises acts of:
      A1) generating first visible light in the workspace via at least one first LED-based lighting unit; and
      A2) generating second visible light in the workspace via at least one second LED-based lighting unit, and
   wherein the act B) comprises an act of controlling at least one of a first color and a first color temperature of the first visible light and at least one of a second color and a second color temperature of the second visible light via the at least one user-interface,
   and wherein:
   the at least one first LED-based lighting unit includes at least one first addressable lighting unit having at least one first address and the at least one second LED-based lighting unit includes at least one second addressable lighting unit having at least one second address different than the first address;
   the act B) comprises an act of: B1) controlling the at least one of the first color and the first color temperature of the first visible light based on the at least one first address, and controlling the at least one of the second color and the second color temperature of the second visible light based on the at least one second address;
   the at least one user-interface includes at least one graphics user interface (GUI) associated with a computer display; and
   the method further comprises acts of: B2) selecting via the graphics user interface at least one user-definable parameter associated with at least one of the first visible light and the second visible light; and B3) performing the act B1) based at least in part on the at least one user-definable parameter.

30. The method of claim 29, wherein the act B2) comprises an act of specifying at least one of the first color, the first color temperature, the second color and the second color temperature via the at least one user-definable parameter.

31. The method of claim 29, wherein the act B2) comprises an act of specifying at least one lighting effect involving at least one of the first visible light and the second visible light via the at least one user-definable parameter.

32. The method of claim 29, wherein the act B2) comprises an act of: specifying a correspondence between at least one condition and the at least one of the first visible light and the second visible light via the at least one user-definable parameter.

33. The method of claim 32, wherein the at least one condition relates to at least one of an identity and a work function of an occupant associated with the workspace.

34. The method of claim 32, wherein the at least one condition relates to a relative location of the workspace in a larger environment comprising multiple workspaces.

35. The method of claim 32, wherein the at least one condition includes at least one sensed environmental condition.

36. The method of claim 35, wherein the at least one sensed environmental condition includes at least one of a motion, a sound, and a natural lighting condition in the workspace.

37. The method of claim 32, wherein the at least one condition includes at least one calendar event having at least one of a date and a time.

38. The method of claim 32, wherein the at least one condition includes at least one emergency or alarm event associated with the workspace.

39. The method of claim 32, wherein the at least one condition includes at least one communication event associated with the workspace.

40. The method of claim 39, wherein the at least one communication event includes at least one of a telephone call and an email message.

41. The method of claim 32, wherein the at least one condition relates to at least one item of information provided by an information source.

42. The method of claim 41, wherein the information source includes the Internet.

43. A workspace, comprising:
at least one work surface;
at least one LED-based lighting unit to generate visible light in the workspace, the visible light including at least one of illumination in at least a portion of the workspace and task lighting directed to at least a portion of the at least one work surface; and
at least one user-interface, coupled to the at least one LED-based lighting unit and configured to facilitate control of at least one of a color and a color temperature of at least one of the illumination and the task lighting,
wherein the at least one LED-based lighting unit includes:
at least one up-lighting unit to provide at least some of the illumination directed upward;
at least one down-lighting unit to provide at least some of the illumination directed downward or at least some of the task lighting.

44. A workspace, comprising:
at least one work surface:
at least one LED-based lighting unit to generate visible light in the workspace, the visible light including at least one of illumination in at least a portion of the workspace and task lighting directed to at least a portion of the at least one work surface; and
at least one user-interface, coupled to the at least one LED-based lighting unit and configured to facilitate control of at least one of a color and a color temperature of at least one of the illumination and the task lighting,
wherein the at least one LED-based lighting unit includes at least one geometric panel lighting unit disposed in the workspace; at least some of the visible light generated by the at least one geometric panel lighting unit constitutes at least one of a static lighting pattern, a dynamic lighting pattern, a graphic display, a text message, and a video; and the at least one user-interface is configured to facilitate selection of the at least one of the static lighting pattern, the dynamic lighting pattern, the graphic display, the text message, and the video,
and wherein the workspace further comprises:
at least one divider to provide at least one boundary for the workspace, the at least one divider including a frame and at least one finished surface exposed to the workspace, wherein the at least one geometric panel lighting unit is integrated to form a portion of the at least one divider.

45. A workspace, comprising:
at least one work surface;
at least one LED-based lighting unit to generate visible light in the workspace, wherein the at least one LED-based lighting unit includes at least one privacy-related lighting unit that is configured to be at least partially transparent when the visible light is not generated and substantially opaque when the visible light is generated; and
at least one user-interface, coupled to the at least one LED-based lighting unit, to facilitate control of at least one of a color and a color temperature of at least some of the visible light generated in the workspace.

46. The workspace of claim 45, further comprising: at least one divider to provide at least one boundary for the workspace, the at least one divider including a frame and at least one finished surface exposed to the workspace, wherein the at least one privacy-related lighting unit is integrated to form a portion of the at least one divider.

47. The workspace of claim 45, wherein the at least one privacy-related lighting unit includes:
an at least partially transparent substrate; and
at least one LED-based light source configured to direct the at least some of the visible light to the at least partially transparent substrate.

48. The workspace of claim 47, wherein the at least one partially transparent substrate includes a rigid panel, and wherein the at least one LED-based light source is configured to generate the at least some of the visible light from within the rigid panel.

49. The workspace of claim 48, wherein the rigid panel includes a plurality of perturbations within the panel or on a surface of the panel that are configured to serve as scattering centers for the at least some of the visible light.

50. The workspace of claim 47, wherein the at least one partially transparent substrate includes at least one of a flexible translucent mesh screen and a halftone screen.

51. A workspace, comprising:
at least one work surface;
at least one LED-based lighting unit to generate visible light in the workspace, the visible light including at least one of illumination in at least a portion of the workspace and task lighting directed to at least a portion of the at least one work surface;
at least one user-interface, coupled to the at least one LED-based lighting unit and configured to facilitate control of at least one of a color and a color temperature of at least one of the illumination and the task lighting; and at least one divider to provide at least one boundary for the workspace, the at least one divider including a frame and at least one finished surface exposed to the workspace; and at least one controller to control the at least one LED-based lighting unit based on at least one control signal relating to operation of the at least one user-interface, wherein the at least one controller is disposed in an interior portion of the frame of the at least one divider.

52. The workspace of claim 51, wherein the at least one LED-based lighting unit is coupled to the at least one divider.

53. A workspace, comprising:

at least one work surface;

at least one LED-based lighting unit to generate visible light in the workspace, the visible light including at least one of illumination in at least a portion of the workspace and task lighting directed to at least a portion of the at least one work surface;

at least one user-interface, coupled to the at least one LED-based lighting unit and configured to facilitate control of at least one of a color and a color temperature of at least one of the illumination and the task lighting; and at least one divider to provide at least one boundary for the workspace, the at least one divider including a frame and at least one finished surface exposed to the workspace; and at least one power supply disposed in an interior portion of the frame of the at least one divider, the at least one power supply receiving as an input an AC line voltage and providing as an output a DC voltage, wherein the DC voltage provides operating power for the at least one LED-based lighting unit.

54. The workspace of claim 53, wherein the at least one finished surface of the divider comprises a powered pin-board coupled to the DC voltage.

55. The workspace of claim 54, wherein the powered pin-board comprises: a positive conductor plane coupled to a positive potential of the DC voltage; a negative conductor plane coupled to a negative potential of the DC voltage; and an insulator disposed between the positive conductor plane and the negative conductor plane.

56. The workspace of claim 55, wherein the at least one LED-based lighting unit includes a power connector including a partially-insulated positive pin and a partially-insulated negative pin to facilitate electrical and mechanical coupling of the lighting unit to the powered pin-board.

57. The workspace of claim 53, wherein the at least one finished surface of the divider comprises a powered slatwall coupled to the DC voltage.

58. The workspace of claim 57, wherein the powered slatwall includes a plurality of powered slats disposed along a horizontal length of the powered slatwall and substantially parallel to the work surface, and wherein each powered slat includes at least one positive connection point coupled to a positive potential of the DC voltage and at least one negative connection point coupled to a negative potential of the DC voltage.

59. The workspace of claim 58, wherein the at least one LED-based lighting unit includes a power connector formed to facilitate electrical and mechanical coupling of the lighting unit to at least one powered slat of the powered slatwall.

* * * * *